United States Patent
Shimomukai et al.

(10) Patent No.: US 10,245,842 B2
(45) Date of Patent: Apr. 2, 2019

(54) PRINTING DEVICE, PRINTING METHOD, PRINTING SYSTEM, IMAGE PROCESSING DEVICE, AND IMAGE PROCESSING METHOD

(71) Applicant: SEIKO EPSON CORPORATION, Tokyo (JP)

(72) Inventors: Takumi Shimomukai, Nagano (JP); Yuko Yamamoto, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/560,836

(22) PCT Filed: Feb. 19, 2016

(86) PCT No.: PCT/JP2016/000906
§ 371 (c)(1),
(2) Date: Sep. 22, 2017

(87) PCT Pub. No.: WO2016/152019
PCT Pub. Date: Sep. 29, 2016

(65) Prior Publication Data
US 2018/0111385 A1    Apr. 26, 2018

(30) Foreign Application Priority Data

Mar. 24, 2015 (JP) ................. 2015-060732
Mar. 24, 2015 (JP) ................. 2015-060735
Mar. 27, 2015 (JP) ................. 2015-065909

(51) Int. Cl.
*B41J 2/525* (2006.01)
*B41J 2/21* (2006.01)
(Continued)

(52) U.S. Cl.
CPC ............. *B41J 2/21* (2013.01); *B41J 2/525* (2013.01); *B41J 19/147* (2013.01); *H04N 1/46* (2013.01); *H04N 1/60* (2013.01); *H04N 1/6097* (2013.01)

(58) Field of Classification Search
CPC . B41J 2/21; B41J 2/525; B41J 19/147; H04N 1/46; H04N 1/60; H04N 1/6097
See application file for complete search history.

(56) References Cited

U.S. PATENT DOCUMENTS 6,351,320 B1    2/2002  Shin
8,259,348 B2 *  9/2012  Kawashima .......... G06F 3/1211
                                                     358/1.15
(Continued)

FOREIGN PATENT DOCUMENTS

JP    11-216881 A    8/1999
JP    2003-025613 A  1/2003
(Continued)

*Primary Examiner* — Sharon A. Polk

(57) ABSTRACT

A printer has a print unit that prints bidirectionally on a print medium; and an adjustment unit that prints, by the print unit, in contrast with each other on a second print medium, a first direction print image generated using first direction color conversion information for a first print medium, and a second direction print image generated using second direction color conversion information for a second print medium; the second direction color conversion information for the second print medium being second direction color conversion information for the first print medium that was adjusted.

7 Claims, 25 Drawing Sheets

(51) Int. Cl.
*H04N 1/46* (2006.01)
*H04N 1/60* (2006.01)
*B41J 19/14* (2006.01)

(56) References Cited

U.S. PATENT DOCUMENTS

| | | | |
|---|---|---|---|
| 2003/0025752 A1 | 2/2003 | Shimizu | |
| 2004/0174403 A1 | 9/2004 | Yoshida et al. | |
| 2008/0079970 A1* | 4/2008 | Matsuhira | G06K 15/02 358/1.9 |

FOREIGN PATENT DOCUMENTS

| | | |
|---|---|---|
| JP | 2003-266749 A | 9/2003 |
| JP | 2004-034435 A | 2/2004 |
| JP | 2007-136845 A | 6/2007 |

* cited by examiner

127 α TABLE

| PAPER TYPE | α VALUE |
|---|---|
| AA | 1.0 |
| BB | 0.8 |
| CC | 1.4 |
| ⋮ | ⋮ |

(a)

(PAPER TYPE A)

| GRID POINT NUMBER | C | M | Y | K |
|---|---|---|---|---|
| 1 | 5.0 | 8.0 | 2.0 | 1.0 |
| 2 | 1.0 | 1.0 | 7.0 | 3.0 |
| 3 | 0.0 | 4.0 | 4.0 | 6.0 |

(PAPER TYPE B)

| GRID POINT NUMBER | C | M | Y | K |
|---|---|---|---|---|
| 1 | 5.0 | 8.0 | 2.0 | 1.0 |
| 2 | 1.0 | 1.0 | 7.0 | 3.0 |
| 3 | 0.0 | 4.0 | 4.0 | 6.0 |

(PAPER TYPE C)

| GRID POINT NUMBER | C | M | Y | K |
|---|---|---|---|---|
| 1 | 5.0 | 8.0 | 2.0 | 1.0 |
| 2 | 1.0 | 1.0 | 7.0 | 3.0 |
| 3 | 0.0 | 4.0 | 4.0 | 6.0 |

(b)

| GRID POINT NUMBER | C | M | Y | K |
|---|---|---|---|---|
| 1 | 12.5 | 8.0 | 12.0 | 2.0 |
| 2 | 4.0 | 5.0 | 7.0 | 3.0 |
| 3 | 0.0 | 9.2 | 8.2 | 7.7 |

| GRID POINT NUMBER | C | M | Y | K |
|---|---|---|---|---|
| 1 | 20.0 | 4.0 | 6.0 | 6.0 |
| 2 | 5.0 | 4.0 | 7.0 | 12.0 |
| 3 | 0.0 | 5.9 | 5.1 | 27.4 |

| GRID POINT NUMBER | C | M | Y | K |
|---|---|---|---|---|
| 1 | 20.6 | 16.0 | 10.0 | 5.0 |
| 2 | 7.0 | 5.0 | 21.0 | 6.0 |
| 3 | 0.0 | 6.5 | 14.1 | 17.0 |

(c)

| GRID POINT NUMBER | C | M | Y | K |
|---|---|---|---|---|
| 1 | 2.5 | 1.0 | 6.0 | 2.0 |
| 2 | 4.0 | 5.0 | 1.0 | 1.0 |
| 3 | 0.0 | 2.3 | 2.1 | 1.3 |

| GRID POINT NUMBER | C | M | Y | K |
|---|---|---|---|---|
| 1 | 4.0 | 0.5 | 3.0 | 6.0 |
| 2 | 5.0 | 4.0 | 1.0 | 4.0 |
| 3 | 0.0 | 1.5 | 1.3 | 4.6 |

| GRID POINT NUMBER | C | M | Y | K |
|---|---|---|---|---|
| 1 | 4.1 | 2.0 | 5.0 | 5.0 |
| 2 | 7.0 | 5.0 | 3.0 | 2.0 |
| 3 | 0.0 | 1.8 | 3.5 | 2.8 |

(PAPER TYPE A)

| GRID POINT NUMBER | C | M | Y | K |
|---|---|---|---|---|
| 1 | 0.6 | 0.0 | 1.0 | 1.0 |
| 2 | 1.0 | 1.0 | 0.0 | 0.0 |
| 3 | 0.0 | 0.3 | 0.2 | 0.3 |

(PAPER TYPE B)

| GRID POINT NUMBER | C | M | Y | K |
|---|---|---|---|---|
| 1 | 0.8 | 0.0 | 1.0 | 1.0 |
| 2 | 1.0 | 1.0 | 0.0 | 0.0 |
| 3 | 0.0 | 0.3 | 0.1 | 0.3 |

(PAPER TYPE C)

| GRID POINT NUMBER | C | M | Y | K |
|---|---|---|---|---|
| 1 | 0.6 | 0.1 | 1.0 | 1.0 |
| 2 | 1.0 | 1.0 | 0.0 | 0.0 |
| 3 | 0.0 | 0.0 | 0.3 | 0.3 |

(b)

| GRID POINT NUMBER | C | M | Y | K |
|---|---|---|---|---|
| 1 | 0.7 | 0.0 | 1.0 | 1.0 |
| 2 | 1.0 | 1.0 | 0.0 | 0.0 |
| 3 | 0.0 | 0.2 | 0.2 | 0.3 |

(c)

| COMPRISES A RATIO | | | | OFFSET | | | |
|---|---|---|---|---|---|---|---|
| $\alpha 1 C$ | $\alpha 1 M$ | $\alpha 1 Y$ | $\alpha 1 K$ | $\alpha 2 C$ | $\alpha 2 M$ | $\alpha 2 Y$ | $\alpha 2 K$ |
| 3.0 | 2.0 | 4.0 | 1.0 | 1.0 | 2.0 | 1.0 | 1.0 |

| COMPRISES A RATIO | | | | OFFSET | | | |
|---|---|---|---|---|---|---|---|
| $\alpha 1 C$ | $\alpha 1 M$ | $\alpha 1 Y$ | $\alpha 1 K$ | $\alpha 2 C$ | $\alpha 2 M$ | $\alpha 2 Y$ | $\alpha 2 K$ |
| 2.0 | 3.0 | 1.0 | 2.0 | 3.0 | 1.0 | 1.0 | 4.0 |

| COMPRISES A RATIO | | | | OFFSET | | | |
|---|---|---|---|---|---|---|---|
| $\alpha 1 C$ | $\alpha 1 M$ | $\alpha 1 Y$ | $\alpha 1 K$ | $\alpha 2 C$ | $\alpha 2 M$ | $\alpha 2 Y$ | $\alpha 2 K$ |
| 5.0 | 4.0 | 2.0 | 3.0 | 2.0 | 1.0 | 3.0 | 2.0 |

PRINTING DEVICE, PRINTING METHOD, PRINTING SYSTEM, IMAGE PROCESSING DEVICE, AND IMAGE PROCESSING METHOD

CROSS REFERENCE TO RELATED APPLICATIONS

This is a U.S. National Phase application of PCT/JP2016/000906, which claims priority to Japanese Patent Application No. 2015-060732, filed on Mar. 24, 2015, Japanese Patent Application No. 2015-065909, filed on Mar. 27, 2015 and Japanese Patent Application No. 2015-060735, filed on Mar. 24, 2015. The entire disclosures of Japanese Patent Application Nos. 2015-060732, 2015-065909 and 2015060735 are hereby incorporated herein by reference.

TECHNICAL FIELD

The present invention relates to a printing device that prints bidirectionally, and relates more particularly to a printing device that can reduce the color difference between printing on the outbound pass and printing on the return pass regardless of the paper type or other printing condition.

The present invention relates to an image processing device of data for bidirectional printing, and relates more particularly to an image processing device enabling easily making changes based on a printing condition, such as the paper type of the color conversion information (color conversion table), and minimizing color differences due to the printing direction.

The invention also relates to an image processing device that processes data for bidirectional printing, and relates more particularly to an image processing device capable of reducing color differences between the outbound printing pass and the return printing pass regardless of printing conditions such as the type of paper.

BACKGROUND

Printers that print by synchronizing operation of the printhead in the main scanning direction, and the paper feed operation in the sub-scanning direction, are known from the literature. Such printers that print on both the outbound pass and the return pass of the printhead (print bidirectionally) in order to increase the printing speed are also known. Such bidirectional printing is widely used in color inkjet printers, but the order in which ink is applied differs on the outbound pass and the return pass due to the arrangement of the nozzle rows for each color, and differences in color between the outbound pass and the return pass can therefore result.

To address this problem, JP-A-2007-136845 proposes technology for eliminating color differences due to the order in which the colorant is deposited in bidirectional printing, and describes a process using two lookup tables, a color process lookup table (LUT) for the outbound pass, and a color process lookup table (LUT for the return pass.

JP-A-2004-34435 describes technology for matching with high precision the color tone of images recorded on the outbound pass and the color tone of images recorded on the return pass, and describes forming the return image of each ejection pressure proportionally to the outbound image.

Furthermore, JP-A-2003-25613 describes determining, based on the name of the print medium, whether the print medium to be printed on absorbs ink easily or resists ink absorption, determines, from the image information of the CMYK image data and the scanning pattern, the degree of change in the hue due to bidirectional recording of the pixels, and changes the density of C, M, and Y to reduce the output density of hues in the input image data with a large change in hue, and increase the output density of hues with a small change in hue.

SUMMARY OF INVENTION

However, even if the color difference between printing on the outbound pass and the return pass is minimized by the related art described above, if printing conditions such as the type of paper (paper type), the print medium, changes, the color difference may increase greatly. JP-A-2007-136845 and JP-A-2004-34435 do not describe a solution to this problem.

Preferably, the user can also easily adjust the color conversion process according to the paper type and other printing conditions.

Further preferably, the user can easily adjust (change) the lookup table (LUT) according to the paper type and other printing conditions.

JP-A-2004-34435 and JP-A-2003-25613 also do not address adjusting the LUT to solve this problem.

An objective of the present invention is therefore to provide a printing device that prints bidirectionally, and can reduce color differences between outbound pass printing and return pass printing regardless of the paper type or other printing conditions.

Another objective of the invention is to provide an image processing device of data for bidirectional printing, the image processing device enabling easily changing the color conversion information (color conversion table) according to the paper type or other printing condition, and suppressing color differences due to the printing direction.

A further objective of the invention is to provide an image processing device for processing data for bidirectional printing, the image processing device enabling reducing color differences between outbound pass printing and return pass printing regardless of the paper type or other printing condition.

To achieve the foregoing objective, one aspect of the invention is a printer having a print unit that prints bidirectionally on print media; and an adjustment unit that causes the print unit to contrastingly print a first direction print image based on first direction color conversion information for a first print medium, and a second direction print image based on second direction color conversion information for a second print medium, on the second print medium; the second direction color conversion information for the second print medium being generated by adjusting second direction color conversion information for the first print medium.

Preferably, the first direction print image and the second direction print image are solid color images printed in a specific color.

Further preferably, the adjustment unit prints the first direction print image and the second direction print image beside each other.

Further preferably, the adjustment unit adjusts the second direction color conversion information for the second print medium based on a specific coefficient; and prints, in pairs with the first direction print image, plural second direction print images using second direction color conversion information that was adjusted based on plural values of the specific coefficient for plural second print media.

Yet further preferably, the adjustment unit acquires an identifier for one of the second direction print images input relationally to the printout of the plural second direction print images, and stores the value of the specific coefficient corresponding to the second direction print image identified by the acquired identifier.

Yet further preferably, when printing in the first direction, the print unit prints based on image data converted using first direction color conversion information for the first print medium; and when printing in the second direction, prints based on image data converted using second direction color conversion information for the second print medium that was adjusted based on the value of the specific coefficient that was stored.

To achieve the foregoing objective, another aspect of the invention is a printing method including: printing a first direction print image based on first direction color conversion information for a first print medium; generates second direction color conversion information for a second print medium that adjusted second direction color conversion information for the first print medium; and prints a second direction print image using the second direction color conversion information for the second print medium in contrast with the first direction print image.

To achieve the foregoing objective, another aspect of the invention is a printing system including a host device and a printer; the printer including a print unit that prints bidirectionally on print media based on image data generated by the host device; and an adjustment unit that causes the print unit to contrastingly print a first direction print image based on first direction color conversion information for a first print medium, and a second direction print image based on second direction color conversion information for a second print medium, on the second print medium; and the host device has a driver unit that generates the image data for the first direction using first direction color conversion information for the first print medium, and generates the image data for the second direction using second direction color conversion information for the second print medium that was used using the value of a specific coefficient determined based on printing by the print unit; the second direction color conversion information for the second print medium being generated by adjusting second direction color conversion information for the first print medium.

To achieve the foregoing objective, another aspect of the invention is an image processing device that processes image data for bidirectional printing, and includes: storage that stores first color conversion information for printing in a first direction, and common conversion information that does not depend on a printing condition; and a color converter that, using the first color conversion information, color converts image data for printing in the first direction, and color converts, using second color conversion information for second direction printing that is generated based on the common conversion information and a coefficient corresponding to a printing condition, image data for printing in the second direction.

Further preferably in another aspect of the invention, the color converter converts the first color conversion information based on the common conversion information and coefficient, and generates the second color conversion information.

Further preferably in another aspect of the invention, the storage stores third color conversion information for printing in the second direction; and the color converter converts the third color conversion information based on the common conversion information and coefficient, and generates the second color conversion information.

Further preferably in another aspect of the invention, the color conversion information is generated by normalizing plural conversion information acquired from fourth color conversion information for second direction printing each respectively prepared for plural printing conditions, and averaging the normalized conversion information.

Further preferably in another aspect of the invention, the printing condition includes the type of paper used for printing.

To achieve the foregoing objective, another aspect of the invention is an image processing method for processing image data for printing in two directions, including: color converting image data for first direction printing using first color conversion information for first direction printing, and color converting image data for second direction printing using second color conversion information for second direction printing that is generated based on common conversion information independent of a printing condition and a coefficient corresponding to a printing condition.

To achieve the foregoing objective, another aspect of the invention is a program causing a computer that processes image data for printing in two directions to execute a process including: color converting image data for first direction printing using first color conversion information for first direction printing, and color converting image data for second direction printing using second color conversion information for second direction printing that is generated based on common conversion information independent of a printing condition and a coefficient corresponding to a printing condition.

To achieve the foregoing objective, another aspect of the invention is an image processing device including: a color converter that, using first color conversion information, converts image data for first direction printing, and using second color conversion information, converts image data for second direction printing; the color converter converting image data for second direction printing based on third color conversion information that is generated based on the first color conversion information and the second color conversion information according to a printing condition.

Preferably in another aspect of the invention, the third color conversion information is generated based on a difference between color data converted using the first color conversion information for a specific color, and color data converted using the second color conversion information.

Further preferably in another aspect of the invention, the third color conversion information is generated by adding, to color data converted using the first color conversion information, the product of the difference multiplied by a coefficient predefined according to the printing condition.

Further preferably in another aspect of the invention, the printing condition includes the type of paper used for printing.

Further preferably in another aspect of the invention, the converted color data contained in the first color conversion information, second color conversion information, and third color conversion information includes the amount of colorant used for printing.

To achieve the foregoing objective, another aspect of the invention is an image processing method, including: converting, based on first color conversion information, image data for printing in a first direction; converting, under a first printing condition, based on second color conversion information, image data for second direction printing; and under a second printing condition, converting the image data for printing in the second direction based on third color conversion information that is generated based on the first color conversion information and the second color conversion information.

To achieve the foregoing objective, another aspect of the invention is a program causing a computer having a controller that converts image data for printing in a first direction based on first color conversion information, and converts image data for printing in a second direction based on second color conversion information, to execute a process including: converting, according to a printing condition, based on third color conversion information that is generated based on the first color conversion information and the second color conversion information, image data for printing in the second direction.

Other objects and features of the invention from the embodiments described below.

BRIEF DESCRIPTION OF DRAWINGS

FIG. 12 shows an example of a common table 127a.

FIG. 13 illustrates the configuration of the carriage 224a.

FIG. 14 illustrates the operation of the carriage 224a relative to the print medium (paper) 229a.

FIG. 15 is a flow chart of steps in a process generating the common table 127a.

FIG. 16 illustrates steps in the process generating the common table 127a.

FIG. 17 illustrates steps in the process generating the common table 127a.

FIG. 18 is a flow chart of steps in a process of the printing system 100a.

FIG. 19 is a flow chart of steps in the color conversion process of the color converter 122a.

DESCRIPTION OF EMBODIMENTS

Figure 1:
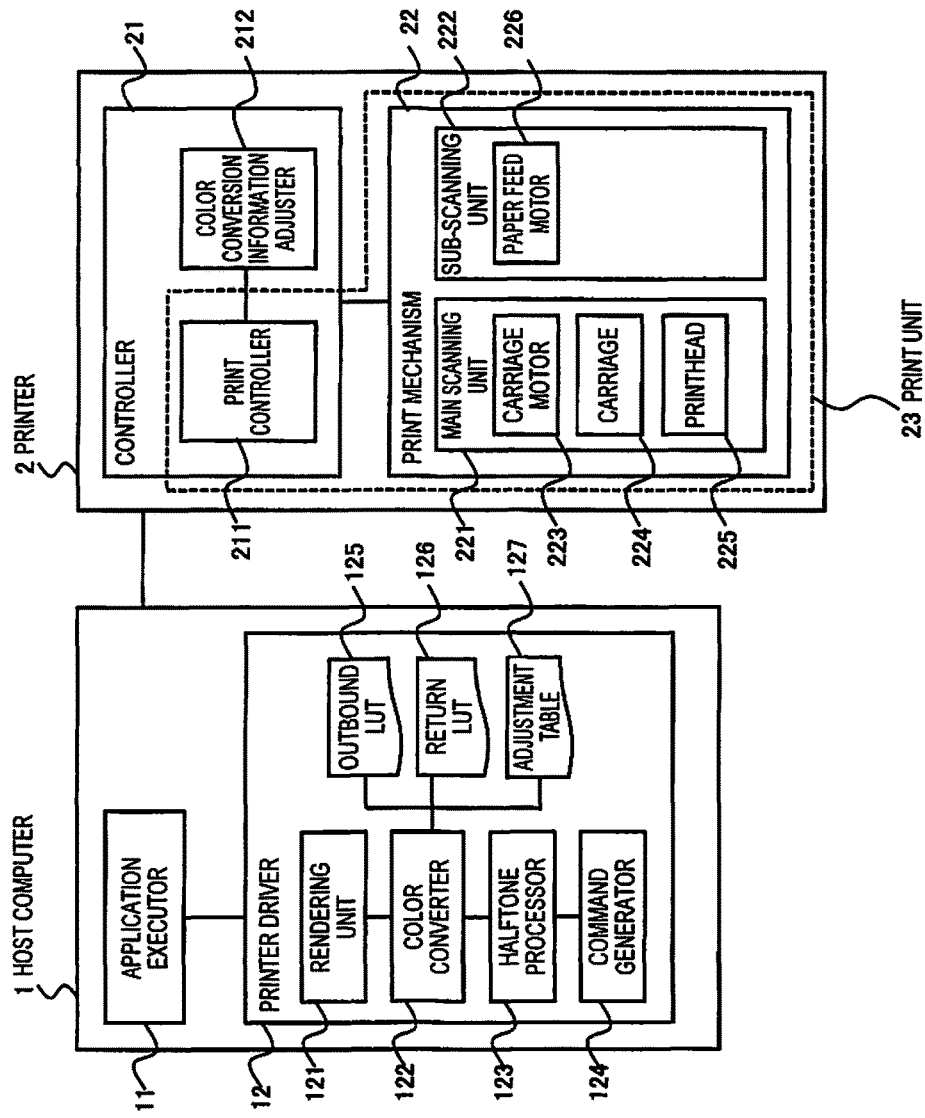
FIG. 1 illustrates the configuration of a first embodiment of a printing system including a printing device according to the invention.

An embodiment of the present invention is described below with reference to the accompanying figures. However, the technical scope of the invention is not limited by the embodiments described below. Note that like or similar parts in the figures are identified by the same reference numerals or symbols.

Embodiment 1

FIG. 1 illustrates the configuration of a first embodiment of a printing system including a printing device according to the invention. The printer 2 shown in FIG. 1 is an example of a printing device according to the invention. The printer 2 is a printer that prints bidirectionally (prints in two directions), during outbound printing prints based on image data output from a color conversion process using a color conversion table (outbound LUT 125, first direction color conversion information) for the outbound pass, and during return printing prints based on image data output from a color conversion process based on a color conversion table (return LUT) for the return pass that is adjusted according to the type of paper (paper type), which is the print medium, that is used. Furthermore, to determine the coefficient α (specific coefficient) for adjusting the color conversion table for the return pass according to the paper type, the printer 2 prints, for each value of coefficient α, an outbound pass image (first direction print image) paired with a return pass image (second direction print image) that was adjusted based on a coefficient α, and sets the value of the coefficient α of the return pass image that was selected by the user as the value of the coefficient α to use to adjust the color conversion table. The resulting printer 2 process can minimize the color difference between outbound printing and return printing appropriately to the paper type, and can simplify the setup process enabling the same.

As shown in FIG. 1, the printing system 100 according to this embodiment includes a host computer 1 and a printer 2, which is a color inkjet printer that prints bidirectionally.

The host computer 1 is a host device of the printer 2 and instructs the printer 2 to print, and is, for example, a personal computer. Furthermore, while not shown in the figures, the host computer 1 has a CPU, RAM, ROM, HDD, display (display device), and operating device (command device).

As shown in FIG. 1, the functional configuration of the host computer 1 includes an application executor 11 and a printer driver 12.

The application executor 11 is the originator of print requests to the printer 2, and sends image data to be printed (referred to below as the original image data) to the printer driver 12 based on the user inputting commands to the host computer 1. The original image data is data in a standard format (such as a GDI (Graphic Data Interface)—compliant format) that expresses text, graphics and other print content by object unit. In the original image data, image colors are expressed as gradations of (such as 256 gray scale values of 0-255) RGB (red, green, and blue) values, for example. Note that the application executor 11a is embodied by a program describing process content, and hardware, such as a CPU and RAM, for example, that executes processes according to the program.

The printer driver 12 handles the driver function for the printer 2, processes the original image data output from the application executor 11 to generate print data for the printer 2, and sends the print data to the printer 2. The printer driver 12 is embodied by a driver program describing the process content, a CPU that executes processes according to the program, data used in the processes, and memory storing the driver program and data.

As shown in FIG. 1, the functional configuration of the printer driver 12 (controller) includes a rendering unit 121, color converter 122, halftone processor 123, command generator 124, outbound LUT 125, return LUT 126, and adjustment table (a table) 127.

The rendering unit 121 executes a rendering process on the original image data output from the application executor 11, and converts the original image data to pixel unit image data. More specifically, the rendering unit 121 converts the original image data to image data in which each pixel is expressed as an RGB gradation (for example, one of 256 gray scale values ranging from 0 to 255). The resulting pixel unit image data is referred to below as RGB pixel data.

The color converter 122 executes a process (color conversion process) that converts the RGB pixel data generated by the rendering unit 121 to color data (referred to below as CMYK pixel data) expressed by the colors of ink used by the printer 2 (in this example, CMYK (cyan, magenta, yellow, black)). The CMYK pixel data is ink volume data representing each pixel as a CMYK gradation (for example, 256 gray scale values ranging from 0 to 255). The CMYK image data is data expressing the volume of each color of ink used in the printer 2.

As described above, the color converter 122 adjusts for a specific printing condition, such as the type of paper (paper type) used as the print medium in the printer 2, in the color conversion process for return printing in the printer 2, and this process is a feature of the printing system according to the invention. The specific content of the color conversion process, including this adjustment process, is described further below.

The halftone processor 123 executes a halftone process that converts the pixel unit image data to image data expressed by the presence of a printed dot. In this embodiment, the halftone processor 123 converts the CMYK pixel data to data (referred to below as dot data) expressing whether or not CMYK dots are printed for each pixel. A printed dot is a dot that is formed by the printer 2 ejecting ink onto the print medium (paper), and in this example multiple dots of different sizes, large, medium, and small, are used. The dot data in this example includes, for each position on the print medium to which ink is ejected, information indicating for each color whether or not a large dot is formed, a medium dot is formed, or a small dot is formed.

The command generator 124 expresses print requests including the image data to be printed as commands for the printer 2. The print requests generated by the command generator 124 are sent as the print data from the host computer 1 to the printer 2. The command generator 124, when generating a print request (print data), includes the dot data in the print data by means of commands for the printer 2.

The outbound LUT 125 (first LUT, first color conversion information) and return LUT 126 (second LUT, second color conversion information) are, respectively, a color conversion table (color conversion information) for outbound printing, and a color conversion table for return printing, in the printer 2. A color conversion table is a table storing data for converting the color expression of the image data output from the application executor 11 to a color expression using the colors of ink used in the printer 2, and more specifically is a table for the color conversion process of the color converter 122. In this embodiment of the invention the color conversion table is for converting color expressions in the RGB color space to color expressions in the CMYK color space.

The color conversion table stores information for distributing the color values (R, G, B) in a three-dimensional color space expressed by 8 bits (256 levels) for each color, R, G, B to the color values (C, M, Y, K) in a four-dimensional color space expressed by 8 bits (256 levels) for each color C, M, Y, K. By using the color conversion table, a desired color in the RGB space can be expressed by CMYK values. However, because the amount of data required to map every possible color (approximately 16.77 million colors) expressed by 8 bits (256 levels) to the corresponding color is massive, the color conversion table actually only stores data for a specific number of gradations n that is less than 256 gradations.

Figure 2:
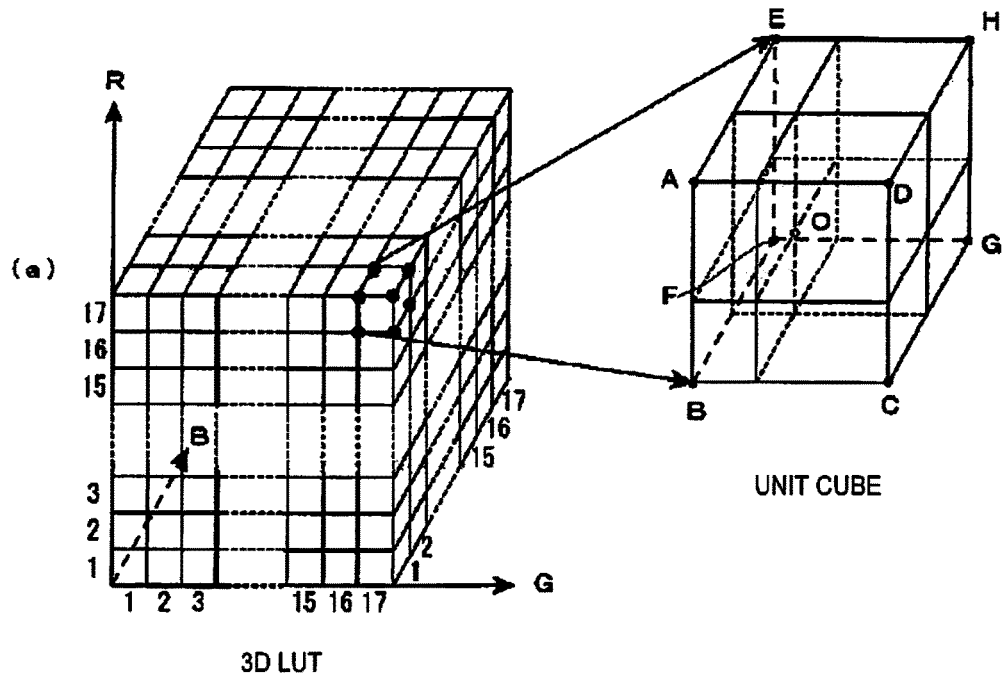
FIG. 2 illustrates a three-dimensional color conversion table.

FIG. 2 shows an example of a color conversion table in three-dimensional space. The example in FIG. 2($a$) expresses each RGB color in 18 gradations (n=18), and the color conversion table assigns a CMYK value (C, M, Y, K) to the RGB value (R, G, B) of each of the 17 squares on each RGB axis in the RGB color space.

If a color to be converted is not on the grid, the color converter 122 calculates the corresponding CMYK values using a suitable interpolation method such as tetrahedral interpolation. In this case, to convert the color at point O in FIG. 2($a$), for example, the CMYK values for point O can be obtained from the CMYK values (FIG. 11($b$)) corresponding to the eight grid points (A to H) of the unit cube containing point O.

Note that the outbound LUT 125 and return LUT 126 respectively contain data adjusted to minimize differences in the colors printed in the printer 2 on the outbound printing and return printing passes using a specific type of paper (referred to below as the standard paper type; first print medium type). The outbound LUT 125 and return LUT 126 are stored in a ROM or hard disk drive device, for example.

The α table 127 is a table storing coefficient α, which is the adjustment value, for the printing condition. In this example, the α table 127 relationally stores, for each paper type (printing condition) of print media used by the printer 2, a paper type identifier and a coefficient α for that paper type. Coefficient α is a coefficient for generating a color conversion table (third LUT, third color conversion information) adjusted to minimize the difference between colors printed during outbound printing and return printing when print media of the paper type corresponding to the coefficient α is used in the printer 2 (under a second printing condition). As described further below, the color converter 122 generates third color conversion information from the outbound LUT 125 (first color conversion information) and return LUT 126 (second color conversion information) for a first printing condition (standard paper type), and coefficient α, and uses the third color conversion information in the color conversion process.

Figures 3, 4:
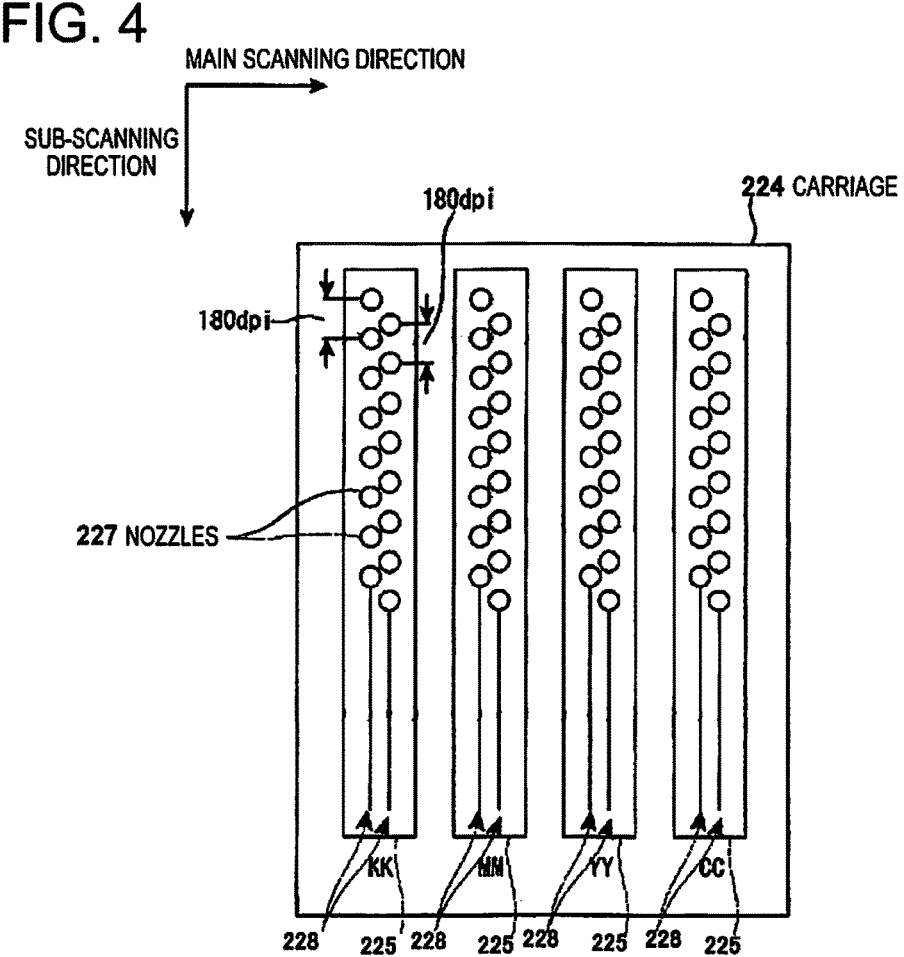
FIG. 3 shows an example of an α table 127.
FIG. 4 illustrates the configuration of the carriage 224.

FIG. 3 illustrates an example of an α table 127. In the example in FIG. 3, the coefficients α of 1.0, 0.8, and 1.4 are stored for the paper types AA, BB, CC. In this example paper type AA is a standard paper type (first print condition). Paper types include, for example, plain paper, glossy paper, synthetic paper, matte paper, and handmade paper, and different manufacturers make different types of even plain paper.

The value of each coefficient α is sent from the color conversion information adjuster 212 (adjuster) of the printer 2 described below and stored in the α table 127. The process whereby the coefficients α are determined by the color conversion information adjuster 212 are described below. The α table 127 is stored in ROM or a hard disk drive, for example.

The printer 2a is a color inkjet printer that executes a printing process based on print commands from the host computer 1a. The printer 2a prints by synchronizing operation of the printhead 225, which has nozzles that eject ink (color material) onto the print medium, in the main scanning direction, and the operation advancing the paper, which is the print medium, in the sub-scanning direction, and prints bidirectionally (in two directions) by ejecting ink in both directions of printhead 225 operation.

As shown in FIG. 1, the printer 2 has a controller 21 and a print mechanism 22.

The controller 21 is embodied by programs containing process content, a CPU that executes processes according to the programs, RAM, ROM that stores the programs, or ASIC, for example. The functional configuration, as shown in FIG. 1, includes a print controller 211 and a color conversion information adjuster 212.

The print controller 211 receives print data in the print commands, and causes the print mechanism 22 to execute a printing process according to the print data. The print controller 211 controls the main scanning unit 221 and sub-scanning unit 222. The print controller 211, as controlled by the color conversion information adjuster 212, causes the print mechanism 22 to print image patches for determining the value of coefficient α.

The color conversion information adjuster 212 executes the process for determining the value of coefficient α. The process executed by the color conversion information adjuster 212 is a feature of this printer 2, and a specific example of the process content is described below.

The print mechanism 22 executes a printing process on the print medium (paper) as instructed by the controller 21. As shown in FIG. 1, the print mechanism 22 has a main scanning unit 221 and sub-scanning unit 222. The print controller 211 and print mechanism 22 enclosed in the dotted line in FIG. 1 are referred to below as the print unit 23.

The main scanning unit 221 has a printhead 225 with nozzles 227 that eject CMYK color inks, a carriage 224 that carries and moves the printhead 225 in the main scanning direction, and a carriage motor 223 for moving the carriage 224.

FIG. 4 is a plan view of the printhead 225 from the nozzle face side. In this example, the printhead 225 has a plurality of nozzles 227 corresponding to the colors black (K), magenta (M), yellow (Y), and cyan (C) arranged in nozzle rows 228 corresponding to each color in the sub-scanning direction (the conveyance direction of the print medium). In this example, each nozzle row 228 comprises 180 nozzles 227 in a zigzag patter at a pitch of 180 dpi (dots per inch).

The printheads 225 are arranged in the order K-M-Y-C in the main scanning direction (direction of carriage 224 movement), eject ink in the order K-M-Y-C on the outbound pass, and eject ink in the order C-Y-M-K on the return pass. Because the ink ejection order differs on the outbound pass and return pass, the order in which the inks are applied changes, and color reproduction is different on the outbound pass and return pass. Therefore, if the same color conversion process is applied in both directions, color differences (mottling) may appear between areas printed on the outbound pass and areas printed on the return pass. In the color conversion process, this embodiment of the invention therefore uses different color conversion tables (a first LUT and a second LUT) for outbound printing and return printing. In addition, when a first LUT and second LUT are used, color differences can be reduced under a first printing condition, but reducing color differences may not be possible under a second printing condition. In this event, a third LUT is used as described above. In this embodiment, there is a difference in ink characteristics based on the type of paper under the first printing condition and second printing condition.

The sub-scanning unit 222 is a device that conveys the print medium 229 in the sub-scanning direction. The sub-scanning unit 222 has a paper feed motor 226 for moving the print medium 229 synchronized to the operation of the printhead 225.

Figure 5:
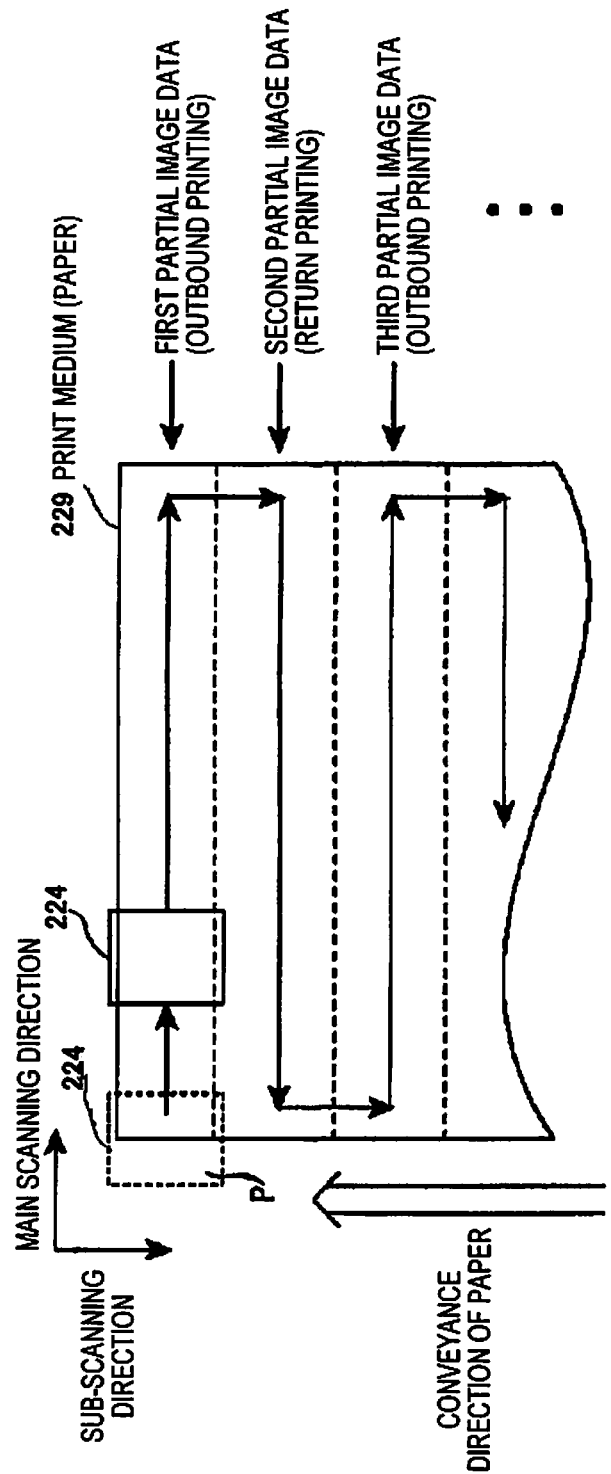
FIG. 5 illustrates the operation of the carriage 224 relative to the print medium (paper) 229.

FIG. 5 illustrates the operation of the carriage 224 relative to the print medium 229. FIG. 5 shows the relative positions of the print medium 229 and carriage 224 with the carriage 224 moving in the direction of the arrows in the figure relative to the print medium 229. The printer 2 prints while moving the carriage 224 in the main scanning direction from the start printing position P (home position) indicated by the dotted line. When printing to the end of the print image ends, the printer 2 stops movement of the carriage 224, advances the paper in the sub-scanning direction, and continues printing while moving the carriage 224 to the start printing position P side. When printing to the end of the print image ends, the printer 2 again stops moving the carriage 224, and after advancing the paper in the sub-scanning direction, and continues printing while moving the carriage 224 in the main scanning direction.

The printer 2 thus prints while repeating printing in the main scanning direction and the paper conveyance operation in the sub-scanning direction. In this example, printing while the carriage 224 moves to the right in the main scanning direction relative to the sub-scanning direction is referred to as "outbound printing," and printing while moving to the left in the main scanning direction is referred to as "return printing." The image data for one pass, which is equal to the image printed in the area that is printed during one outbound printing pass or return printing pass is referred to below as "partial image data."

More specifically, the first unit of partial image data (first partial image data) is printed on the first outbound printing pass. The second unit of partial image data (second partial image data) is then printed on the following return printing pass, and the third unit of partial image data (third partial image data) is then printed on the following outbound printing pass. Odd numbered partial image data is thus printed during outbound printing, and even numbered partial image data is printed during return printing. When printing the entire image is completed, the carriage 224 is moved to the start printing position P and then waits for the next print command.

Processing is executed as described below in the printing system 100 according to the embodiment of the invention configured as described above.

Figure 6:
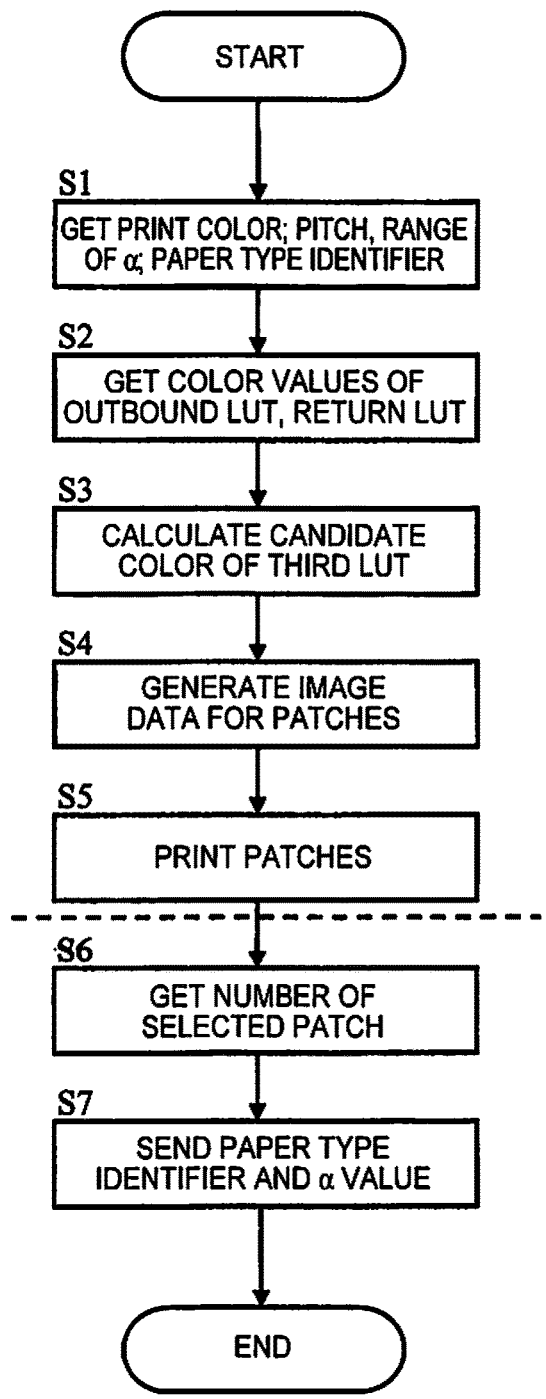
FIG. 6 is a flow chart of an example of a process for determining coefficient α.

The process of determining the coefficient α for generating the color conversion table (third LUT) for return printing appropriately to the paper type of the print medium is described first. FIG. 6 is a flow chart showing an example of the process of determining coefficient α. Note that FIG. 6 describes the process content of the color conversion information adjuster 212.

This process first prints image patches corresponding to multiple coefficients α. The user starts the color conversion information adjuster 212 from an operating unit (not shown in the figure) of the printer 2. Next, from the operating unit of the printer 2, the user inputs the print color (color of the patch), the increment and range of α values, and paper type identifier, and the color conversion information adjuster 212 acquires the input information (step S1 in FIG. 6).

The print color is a representative color for determining LUT (3), and a color enabling an effective color conversion process with little deviation for the paper type is selected. The print color can be determined by various methods.

One method selects a color with the greatest difference between LUT (1) and LUT (2). This method selects the color with the greatest total ($\Delta C+\Delta M+\Delta Y+\Delta K$) of the difference ($\Delta C=C2-C1$, $\Delta M=\Delta M2-M1$, $\Delta Y=Y2-Y1$, $\Delta K=K2-K1$) between each color component of the converted color (C1, M1, Y1, K1) stored for that color (R, G, B) in LUT (1), and the converted color (C2, M2, Y2, K2) stored for that color (R, G, B) in LUT (2).

In a variation of this method, a specific number (such as 10) of colors with the greatest color difference may be selected, and of this specific number of colors, the color with the lowest K value (the value of K2) (that is, the color using the smallest amount of black ink) may be selected.

In a second method, a user of the printing system 100 specifies the color. This method is effective when there is a color for which it is important to prevent mottling.

A third method is to select a color that is frequently used in the printing system 100.

The increment and range of a are the pitch, and minimum and maximum α values in the generated image patch. For example, if the increment is 0.2 and the range is 0 to 2.0, image patches are generated for each α at an increment of 0.2 from an image patch corresponding to α=0 to an image patch corresponding to α=2.0, and the resulting 11 image patches are then generated (printed).

Having acquired this information, the color conversion information adjuster 212 acquires from the application executor 11 the values of the converted colors (C1, M1, Y1, K1) and (C2, M2, Y2, K2) corresponding to the acquired print color (R, G, B) in the outbound LUT 125 and the return LUT 126 (step S2 in FIG. 6).

Next, the color conversion information adjuster 212 calculates the color (C3, M3, Y3, K3) of each image patch to generate (step S3 in FIG. 6). In other words, the color conversion information adjuster 212 determines candidate colors in LUT (3). More specifically, the color conversion information adjuster 212 determines each α value for generating an image patch from the increments and ranges of a determined in step S1, and calculates the color (C3, M3, Y3, K3) of the image patch corresponding to each α using the following equations.

$$C3=C1+\alpha \times (C2-C1)$$

$$M3=M1+\alpha \times (M2-M1)$$

$$Y3=Y1+\alpha \times (Y2-Y1)$$

$$K3=K1+\alpha \times (K2-K1)$$

In the above example in which the increment of a is 0.2 and the range is 0 to 2.0, the color (C3, M3, Y3, K3) of each of the 11 image patches from α=0.0, α=0.2, α=0.4 to α=2.0 is determined.

Figure 7:
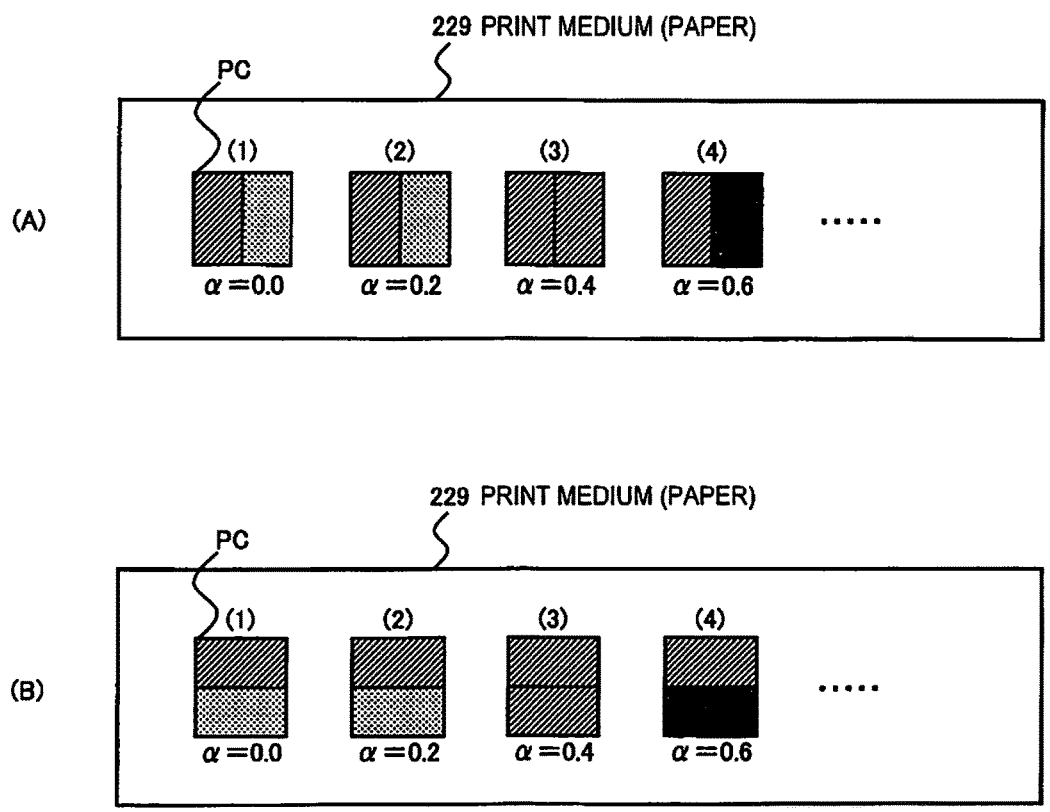
FIG. 7 shows an example of printed image patches.

Next, the color conversion information adjuster 212 generates image data for each image patch according to the calculated color (C3, M3, Y3, K3) of each image patch (step S4 in FIG. 6). FIG. 7 shows examples of the printed image patches. In FIGS. 7 (A) and (B), the image rectangles (PC in the figure) with numbers (1), (2) and so forth (patch identifier) are image patches corresponding to the indicated a values.

Each image patch comprises two adjacent rectangles in the main scanning direction (FIG. 7 (A)) or sub-scanning direction (FIG. 7 (B)). Of the two rectangles, the rectangles on the left in FIG. 7 (A) or the top in FIG. 7 (B) are the images printed on the outbound printing pass, that is, images of the converted color (C1, M1, Y1, K1) in the outbound LUT 125; and rectangles on the right in FIG. 7 (A) or the bottom in FIG. 7 (B) are candidate images printed on the return printing pass, that is, images of the color (C3, M3, Y3, K3) calculated in step S3.

In each image patch ((1), (2), . . . ), the image printed on the outbound pass is the same color (color data), and the image printed on the return pass is an image of the color (color data) calculated using the α value shown below the image, and is an image of the color that differs by a.

The image patches generated by the printing system 100 enable easily comparing colors during outbound printing and colors during return printing on a second type of print medium.

The color conversion information adjuster 212 generates print data for printing the image patches. More specifically, the color conversion information adjuster 212 generates image data for each of the above image patches (data with a color value for each pixel) from the values (C1, M1, Y1, K1) acquired in step S2, the values (C3, M3, Y3, K3) corresponding to each α calculated in step S3, and predetermined location information for each image patch.

Next, the color conversion information adjuster 212 applies the same halftone process as the process of the halftone processor 123 to the generated image data, generates dot data, and outputs data enabling the generated dot data to be interpreted by the print controller 211.

The color conversion information adjuster 212 generates a patch identifier for each image patch, and includes an image of the patch identifier in the print data so that the patch identifier is printed near the corresponding image patch. The color conversion information adjuster 212 also stores the patch identifier relationally to the α value of the image patch corresponding to the patch identifier.

As a result, when print data for the image patch is generated, the color conversion information adjuster 212 passes the print data to the print controller 211 and instructs printing the image patch (step S5 in FIG. 6).

The print controller 211 receiving the print command interprets the received print data, and controls the print mechanism 22 based on the interpretation to make the print mechanism 22 print the image patches. As a result, image patches such as shown in FIG. 7 are printed on the print medium (paper) 229. Note that the printed print medium (paper) 229 is the print medium of the paper type identified by the paper type identifier acquired by the color conversion information adjuster 212 in step S1. The patch identifier added to each image patch described above is also printed beside each image patch as shown in FIG. 7. Note that not printing the α value of each image patch shown in FIG. 7 is also possible.

When image patches are printed as described above, the user of the printing system 100 checks (for example, visually compares) the image patches and selects the image patch with the least difference between the outbound pass image and the return pass image (the color difference between the left and right rectangles in each image patch in the example shown in FIG. 7 (A)). The user then inputs to the printer 2 the patch identifier (such as the patch number (1), (2) in the example in FIG. 7) printed beside the selected image patch. Because the color difference between the outbound image and the return image is smallest in the image patch of patch number (3) in the examples in FIGS. 7 (A) and (B), information identifying patch number (3) is input to the printer 2. Note that the patch identifier may be input through an operating unit (not shown in the figure) of the printer 2.

The color conversion information adjuster 212 then acquires the input patch identifier (step S6 in FIG. 6). Next, the color conversion information adjuster 212 acquires the α value stored relationally to the acquired patch identifier, and sends the α value with the paper type identifier acquired in step S1 to the host computer 1 (step S7 in FIG. 6). Because the patch number (3) is selected by the user in the example in FIG. 7, 0.4 is sent as the α value to the host computer 1.

The α value and paper type identifier are stored in the α table 127 of the printer driver 12 with the α value related to the paper type identifier.

The process of determining the coefficient α for generating a color conversion table (LOT (3)) for return printing based on the type of the print medium is executed as described above.

Note that one print color is specified, an image patch is generated, and the α value is determined from the resulting image patch for one paper type above, but multiple print colors may be specified. In this event, steps S2 to S5 above are executed for each specified color, the user selects from among the generated image patches the image patches with the smallest color difference, and the α values are determined from the selected image patches. The average of the multiple α values is then set as the α value for that paper type.

The complete process from the application executor 11 asserting a print request to the printer 2 executing the printing process is described next.

Figure 8:
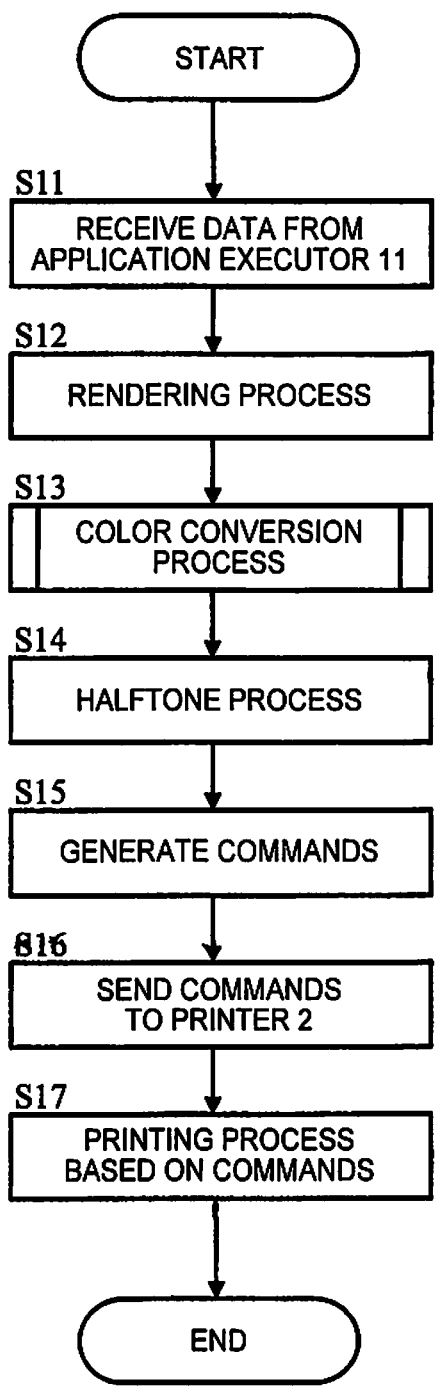
FIG. 8 is a flow chart of a process of the printing system 100.

FIG. 8 is a flow chart showing an example of the process of the printing system 100. When a print request is asserted by the application executor 11, the printer driver 12 receives the print request including the original image data (step S11 in FIG. 8). Note that information about the type of the print medium used in the printer 2 (referred to below as the paper type identifier) is included in the print request as a print condition.

The received print request information is passed to the rendering unit 121, and the rendering unit 121 executes a rendering process on the original image data contained in the print request to generate RGB pixel data (step S12 in FIG. 8).

The print request including the generated RGB pixel data is passed to the color converter 122, and the color converter 122 then executes the color conversion process and converts the RGB pixel data to CMYK pixel data (step S13 in FIG. 8). In this color conversion process, the color converter 122 generates a third LUT (third color conversion information) for the return pass using the outbound LUT (first color conversion information), return LUT (second color conversion information), and adjustment table (α table) 127, and using the third LUT executes a process appropriate to the paper type specified by the paper type identifier. The specific content of the color conversion process is described below.

The print request including the generated CMYK pixel data is passed to the halftone processor 123, and the halftone processor 123 executes a halftone process on the CMYK pixel data and converts the CMYK pixel data to dot data (step S14 in FIG. 8).

The print request including the generated dot data is then passed to the command generator 124, and the command generator 124 generates print data expressing the print request with commands for the printer 2 (step S15 in FIG. 8).

The host computer 1 sends the generated print data to the printer 2 (step S16 in FIG. 8).

The printer 2 receives the print data, and executes a printing process according to the commands contained in the print data (step S17 in FIG. 8). More specifically, the controller 21 interprets the commands, and controls the main scanning unit 221 and sub-scanning unit 222 of the print mechanism 22 based on the interpreted result. The print mechanism 22 operates as controlled, and by the bidirectional operation of the printhead 225, ejects ink and prints on the print medium indicated by the paper type identifier.

The process from requesting printing to printing is thus executed.

Figure 9:
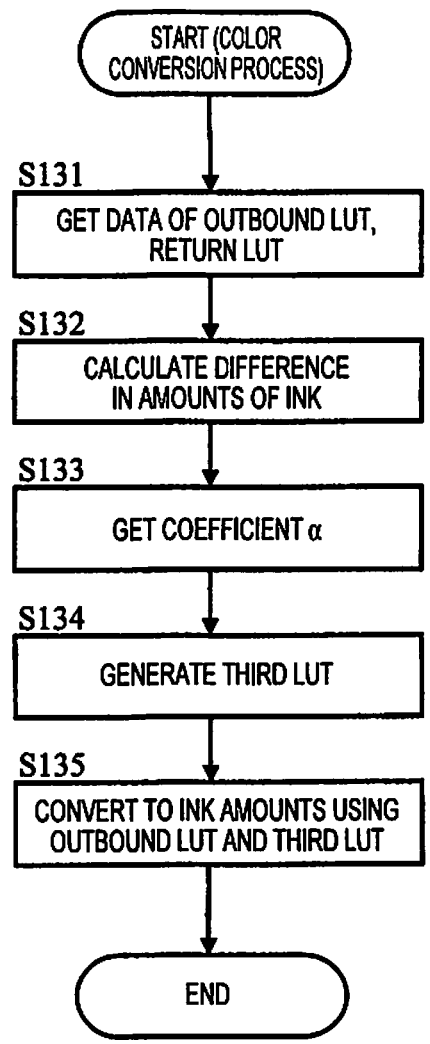
FIG. 9 is a flow chart illustrating steps in the color conversion process.

FIG. 9 is a flow chart of steps in the color conversion process of the color converter 122 (step S13 in FIG. 8).

First, the color converter 122 acquires the data of the outbound LUT 125 and return LUT 126 (step S131 in FIG. 9).

Next, the color converter 122 determines the difference (referred to below as DIF) between the amounts of ink (amounts of colorant) in the outbound LUT 125 and return LUT 126 (step S132 in FIG. 9). More specifically, for each grid point (R, G, B) described above, the color converter 122 calculates the difference of the value of each color (color data) (C, M, Y, K) stored in the return LUT 126 (referred to below as (C2, M2, Y2, K2)) minus the value of each corresponding color (C, M, Y, K) stored in the outbound LUT 125 (referred to below as (C1, M1, Y1, K1)). More specifically, the color converter 122 calculates the values $\Delta C = C2 - C1$, $\Delta M = M2 - M1$, $\Delta Y = Y2 - Y1$, $\Delta K = K2 - K1$ for each grid point (R, G, B).

Next, the color converter 122 acquires the value of coefficient α from the α table 127 (step S133 in FIG. 9). More specifically, the color converter 122 reads from the α table 127 the value of the coefficient α stored relationally to the paper type identified by the paper type identifier contained in the print request. In the example in FIG. 3, if the paper type is BB, the color converter 122 acquires the value 0.8 as the value of coefficient α.

Next, the color converter 122 generates third color conversion information for return printing appropriate to the paper type identified by the paper type identifier (step S134 in FIG. 9). The color converter 122 generates the third color conversion information by reflecting the difference in the amounts of ink in the outbound LUT 125 and return LUT 126 on the values of the outbound LUT 125 at a ratio proportional to the value of the acquired coefficient α.

More specifically, the color converter 122 calculates, for each grid point, the (C, M, Y, K) values (referred to below as (C3, M3, Y3, K3)) corresponding to the (R, G, B) values of each grid point in the third color conversion information using the following equations.

$$C3 = C1 + \alpha \times \Delta C$$

$$M3 = M1 + \alpha \times \Delta M$$

$$Y3 = Y1 + \alpha \times \Delta Y$$

$$K3 = K1 + \alpha \times \Delta K$$

Note that the grid points (R, G, B) are the same in the outbound LUT 125, return LUT 126, and third LUT.

Next, the color converter 122 converts the RGB pixel data to CMYK pixel data using the outbound LUT 125 and third LUT (step S135 in FIG. 9). In the color conversion process, the color converter 122 generates CMYK pixel data using the outbound LUT 125 for the RGB pixel data used for outbound printing, and for the RGB pixel data used for return printing, generates CMYK pixel data using the third LUT. More specifically, for each pixel in the RGB pixel data, the color converter 122 converts the R, G, B values of the pixel to the C, M, Y, K values stored at that grid point in the color conversion table if that RGB value is a grid point in the color conversion table (outbound LUT 125 or third LUT); and if that RGB value is not a grid point in the color conversion table, converts the R, G, B values to C, M, Y, K values by the interpolation process described above using the C, M, Y, K values of the surrounding grid points.

In this way, a color conversion table (third LUT) that is adjusted according to the type of paper used for printing to minimize color differences between outbound printing and return printing is used for return printing.

The color conversion process is executed as described above. Note that the color converter 122 may store the generated third LUT until processing the next print request. In this case, if the paper type specified by the next print request is the same as the paper type used to generate the third LUT, the color converter 122 can omit the process of steps S31 to S34 in the color conversion process applied to the next print request, and the stored third LUT can be used in step S35.

Changing (adjusting) the color conversion table for return printing based on coefficient α is described above, but the color conversion table for outbound printing may also be changed according to the paper type. This configuration also generates a new color conversion table for outbound printing based on the difference between the outbound LUT 125 and return LUT 126 using coefficients previously defined for paper types as described above, and uses the color conversion table that is generated in the color conversion process.

Third LUTs corresponding to different paper types may also be previously generated and stored, and the appropriate third LUT may be used in the color conversion process.

Furthermore, in the printing system 100 according to this embodiment, a color conversion information adjuster 212 on the printer 2 side executes the process determining the α values, but the printing system 100 may be configured to execute the same process on the host computer 1 side.

In addition, the color conversion process is executed on the host computer 1 side in the printing system 100 according to this embodiment, but may be executed on the printer 2 side.

Furthermore, the color conversion table is adjusted using the paper type as the printing condition in this embodiment, but the color conversion table may be adjusted according to other printing conditions, including temperature and humidity.

As described above, the printing system according to the foregoing embodiment and variations thereof can easily adjust the color conversion table because the user visually determines, based in printed image patches (image samples), the value of coefficient α used for generating a color conversion table appropriate to the paper type or other printing condition.

Furthermore, because the printed image patches are solid color images with the images for comparison printed side by side, color differences therebetween are easily recognized and can be accurately identified by the user.

Furthermore, by specifying a color with an obvious color difference as the print color for determining α, a color conversion table with little color difference can be adjusted, and color differences between outbound printing and return printing can be minimized.

Furthermore, because a color conversion table for outbound printing or return printing that was appropriately adjusted by coefficient α for the printing condition is used in the color conversion process when printing, color differences between outbound printing and return printing can be minimized under various printing conditions.

Note that the foregoing embodiment describes a color conversion process from RGB color space to CMYK color space, the invention can also be applied to color conversion processes for converting between other color spaces.

Embodiment 2

Figure 10:
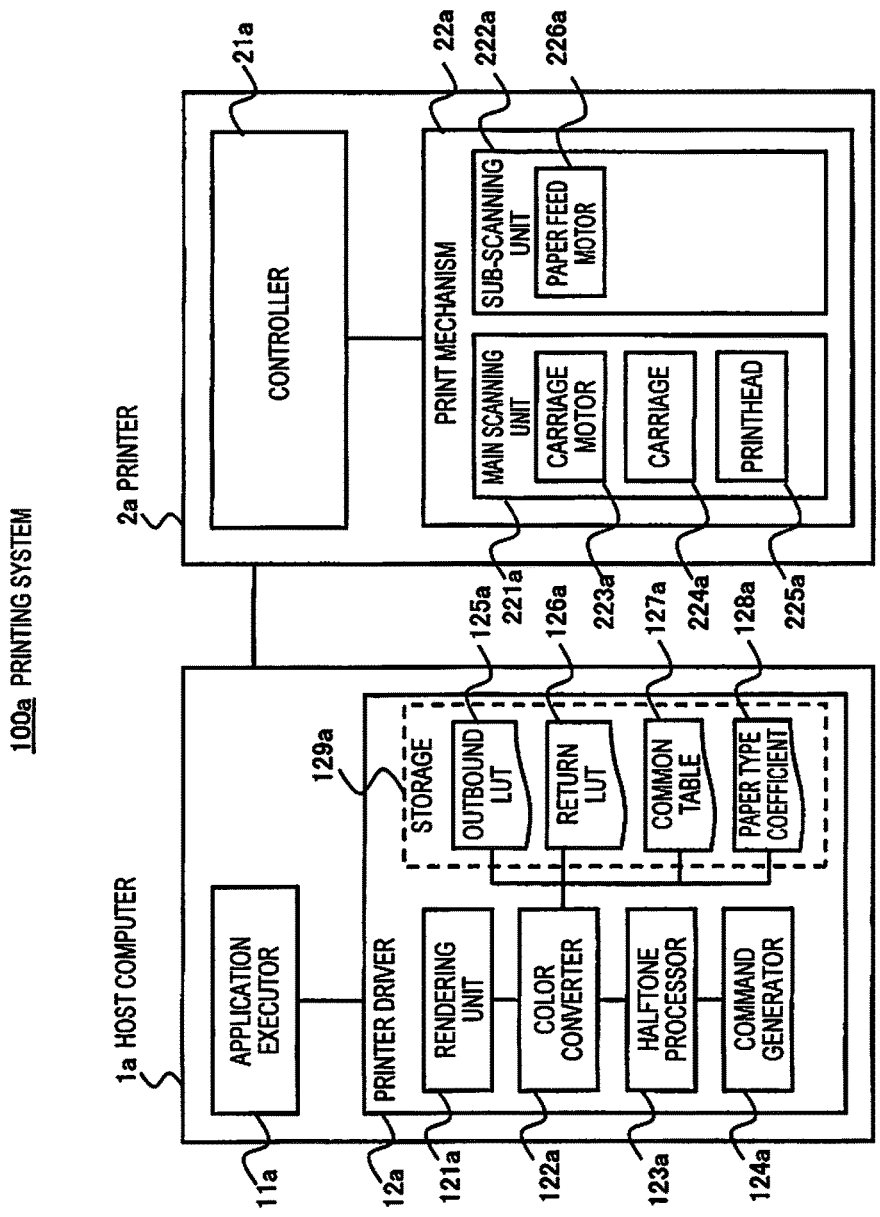
FIG. 10 illustrates a second embodiment of a printing system including an image processing device according to the invention.

FIG. 10 illustrates the configuration of a second embodiment of a printing system including an image processing device according to the invention. The printer driver 12a shown in FIG. 10 is an example of the image processing device according to the invention. In the color conversion process executed in the process of generating print data for a printer 2a that prints bidirectionally (prints in two directions), the printer driver 12a generates a lookup table (second color conversion information), based on an outbound pass color conversion table (outbound LUT 125a, first color conversion information) that is previously defined for the paper type, a common table 127a (common conversion information) expressing common trends independent of the paper type, and a paper type coefficient 128a representing characteristics of the paper type used, and uses the generated lookup table in the color conversion process applied for the return pass. As a result of this process, color differences between outbound printing and return printing passes produced by the printer 2 due to the paper type can be reduced, and the user may simply input a paper type coefficient 128a.

As shown in FIG. 10, the printing system 100a according to this embodiment includes a host computer 1a and a printer 2a, which is a color inkjet printer that prints bidirectionally.

The host computer 1a is a host device of the printer 2a and instructs the printer 2a to print, and is, for example, a personal computer. Furthermore, while not shown in the figures, the host computer 1a has a CPU, RAM, ROM, HDD, display (display device), and operating device (command device).

As shown in FIG. 10, the functional configuration of the host computer 1a includes an application executor 11a and a printer driver 12a.

The application executor 11a is the originator of print requests to the printer 2a, and sends image data to be printed (referred to below as the original image data) to the printer driver 12a based on the user inputting commands to the host computer 1a. The original image data is data in a standard format (such as a GDI (Graphic Data Interface)—compliant format) that expresses text, graphics and other print content by object unit. In the original image data, image colors are expressed as gradations of (such as 256 gray scale values of 0-255) RGB (red, green, and blue) values, for example. Note that the application executor 11a is embodied by a program describing process content, and hardware, such as a CPU and RAM, for example, that executes processes according to the program.

The printer driver 12a handles the driver function for the printer 2a, processes the original image data output from the application executor 11a to generate print data for the printer 2a, and sends the print data to the printer 2a. The printer driver 12a is embodied by a driver program describing the process content, a CPU that executes processes according to the program, data used in the processes, and memory storing the driver program and data.

As shown in FIG. 10, the functional configuration of the printer driver 12a includes a rendering unit 121a, color converter 122a, halftone processor 123a, command generator 124a, outbound LUT 125a, return LUT 126a, common table 127a, paper type coefficient 128a, and storage 129.

The rendering unit 121a applies a rendering process to the original image data output from the application executor 11a, and converts the original image data to pixel unit image data. More specifically, the rendering unit 121a converts the original image data to image data in which each pixel is expressed as an RGB gradation (for example, one of 256 gray scale values ranging from 0 to 255). The resulting pixel unit image data is referred to below as RGB pixel data.

The color converter 122a executes a process (color conversion process) that converts the RGB pixel data generated by the rendering unit 121a to color data (referred to below as CMYK pixel data) expressed by the colors of ink used by the printer 2a (in this example, CMYK (cyan, magenta, yellow, black)). The CMYK pixel data is ink volume data representing each pixel as a CMYK gradation (for example, 256 gray scale values ranging from 0 to 255). The CMYK image data is data expressing the volume of each color of ink used in the printer 2a.

As described above, the color converter 122a adjusts for a specific printing condition, such as the type of paper (paper type) used as the print medium in the printer 2a, in the color conversion process for printing on the return pass (printing in the second direction) of the printer 2a, and this process is a feature of the printing system according to the invention. The specific content of the color conversion process, including this adjustment process, is described further below.

The halftone processor 123a executes a halftone process that converts the pixel unit image data to image data expressed by the presence of a printed dot. In this embodiment, the halftone processor 123a converts the CMYK pixel data to data (referred to below as dot data) expressing what CMYK dots are printed for each pixel. A printed dot is a dot that is formed by the printer 2a ejecting ink onto the print medium (paper), and in this example uses multiple different sizes of dots, large, medium, and small, are used. The dot data in this example includes, for each position on the print medium to which ink is ejected, information indicating for each color whether or not a large dot is formed, a medium dot is formed, or a small dot is formed.

The command generator 124a expresses print requests including the image data to be printed as commands for the printer 2a. The print requests generated by the command generator 124a are sent as the print data from the host computer 1a to the printer 2a. The command generator 124a, when generating a print request (print data), includes the dot data in the print data by means of commands for the printer 2a.

The storage 129a stores an outbound LUT 125a (first color conversion information), return LUT 126a (third color conversion information), common table 127a (common conversion information), and paper type coefficient 128a, and may be a hard disk drive or memory, for example.

The outbound LUT 125a and return LUT 126a are, respectively, a color conversion table (color conversion information) for printing on the outbound pass (first printing direction), and a color conversion table (color conversion information) for printing on the return pass (second printing direction), in the printer 2a. A color conversion table is a table storing data for converting the color expression of the image data output from the application executor 11a to a color expression using the colors of ink used in the printer 2a, and more specifically is a table for the color conversion process of the color converter 122a. In this embodiment of the invention the color conversion table is for converting color expressions in the RGB color space to color expressions in the CMYK color space.

The color conversion table stores information for distributing the color values (R, G, B) in a three-dimensional color space expressed by 8 bits (256 levels) for each color, R, G, B to the color values (C, M, Y, K) in a four-dimensional color space expressed by 8 bits (256 levels) for each color C, M, Y, K. By using the color conversion table, a desired color in the RGB space can be expressed by CMYK values. However, because the amount of data required to map every possible color (approximately 16.77 million colors) expressed by 8 bits (256 levels) to the corresponding color is massive, the color conversion table actually only stores data for a specific number of gradations n that is less than 256 gradations.

Figure 11:
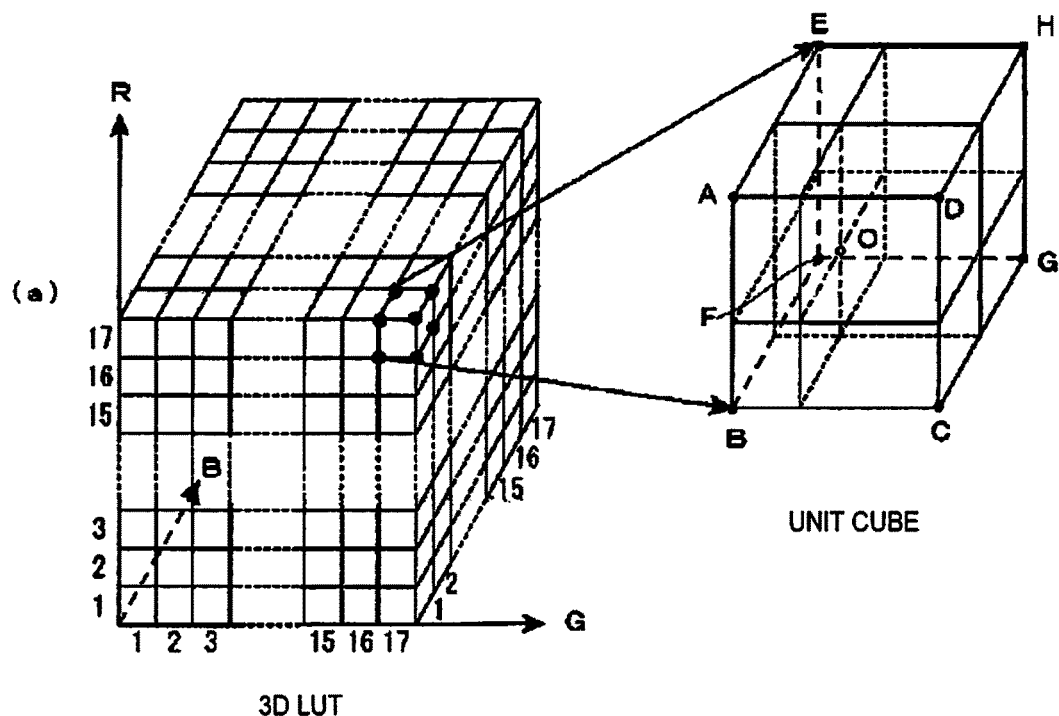
FIG. 11 illustrates a three-dimensional color conversion table.

FIG. 11 shows an example of a color conversion table in three-dimensional space. The example in FIG. 11(a) expresses each RGB color in 18 gradations (n=18), and the color conversion table assigns a CMYK value (C, M, Y, K) to the RGB value (R, G, B) of each of the 17 squares on each RGB axis in the RGB color space.

If a color to be converted is not on the grid, the color converter 122a calculates the corresponding CMYK values using a suitable interpolation method such as tetrahedral interpolation. In this case, to convert the color at point O in FIG. 11(a), for example, the CMYK values for point O can be obtained from the CMYK values (FIG. 11(b)) corresponding to the eight grid points (A to H) of the unit cube containing point O.

Note that the outbound LUT 125a and return LUT 126a respectively contain data adjusted to minimize differences in the colors printed by the printer 2a on the outbound printing and return printing passes using a specific type of paper (referred to below as the standard paper type). The outbound LUT 125a (first color conversion information) and return LUT 126a (third color conversion information) are lookup tables for a standard paper type. Note that below a return LUT without the reference numeral 126a means all return LUTs, and is not limited to the return LUT 126a stored in the host computer 1a. The outbound LUT 125a and return LUT 126a are stored on hard disk drive, for example. Note that when the storage 129a stores the paper type coefficient 128a described below for the standard paper type, the return LUT 126a may be omitted. Note also that the outbound LUT 125a is also used in the color conversion process for paper types other than the standard paper type in this embodiment. In addition, paper types include, for example, plain paper, glossy paper, synthetic paper, matte paper, and handmade paper, and different manufacturers make different types of even plain paper.

The common table 127a is a table storing information expressing differences between the return LUT and the outbound LUT 125a as a common tendency independent of the paper type. More specifically, in this example, the common table 127a stores a ratio between the (C, M, Y, K) values in the return LUT and the outbound LUT 125a that are assigned to the same grid points in the RGB space described based on FIG. 11. In other words, the common table 127a stores information for converting the color values (CMYK) stored in the outbound LUT 125a to the color values (CMYK) stored in the return LUT. The values of the ratios are stored as normalized values.

Figure 12:

FIG. 12 shows an example of a common table 127a. In the example in FIG. 12, the common table 127a stores 0.5 as the value for C (cyan) at grid point 1, and this means that the C value assigned to grid point 1 in the return LUT is 0.5 times the C value assigned to grid point 1 in the outbound LUT 125a. The same principle applies to the other colors and grid points.

A method of generating the common table 127a is described further below.

The paper type coefficient 128a is a coefficient for translating the common table 127a to conversion information specific to different paper types. The paper type coefficient 128a comprises a ratio ($\alpha 1$) and an offset ($\alpha 2$), and these two coefficients are stored relationally to each paper type (relationally to the paper type identifier). Note that when the standard paper type return LUT 126a is not stored, this embodiment of the invention stores at least a paper type coefficient 128a for the standard paper type.

The printer 2a is a color inkjet printer that executes a printing process based on print commands from the host computer 1a. The printer 2a prints by synchronizing operation of the printhead 225a, which has nozzles that eject ink (colorant) onto the print medium, in the main scanning direction, and the operation advancing the paper, which is the print medium, in the sub-scanning direction, and prints bidirectionally (in two directions) by ejecting ink in both directions of printhead 225a operation.

As shown in FIG. 10, the printer 2a has a controller 21a and a print mechanism 22a.

The controller 21a receives print data with the print commands, and causes the print mechanism 22a to execute a printing process according to the print data. The controller 21a is embodied by programs containing process content, a CPU that executes processes according to the programs, RAM, ROM that stores the programs, or ASIC, for example.

The print mechanism 22a executes a printing process on the print medium (paper) as instructed by the controller 21a. As shown in FIG. 10, the print mechanism 22a has a main scanning unit 221a and sub-scanning unit 222a.

The main scanning unit 221a has a printhead 225a with nozzles 227a that eject CMYK color inks, a carriage 224a that carries and moves the printhead 225a in the main scanning direction, and a carriage motor 223a for moving the carriage 224a.

Figure 13:
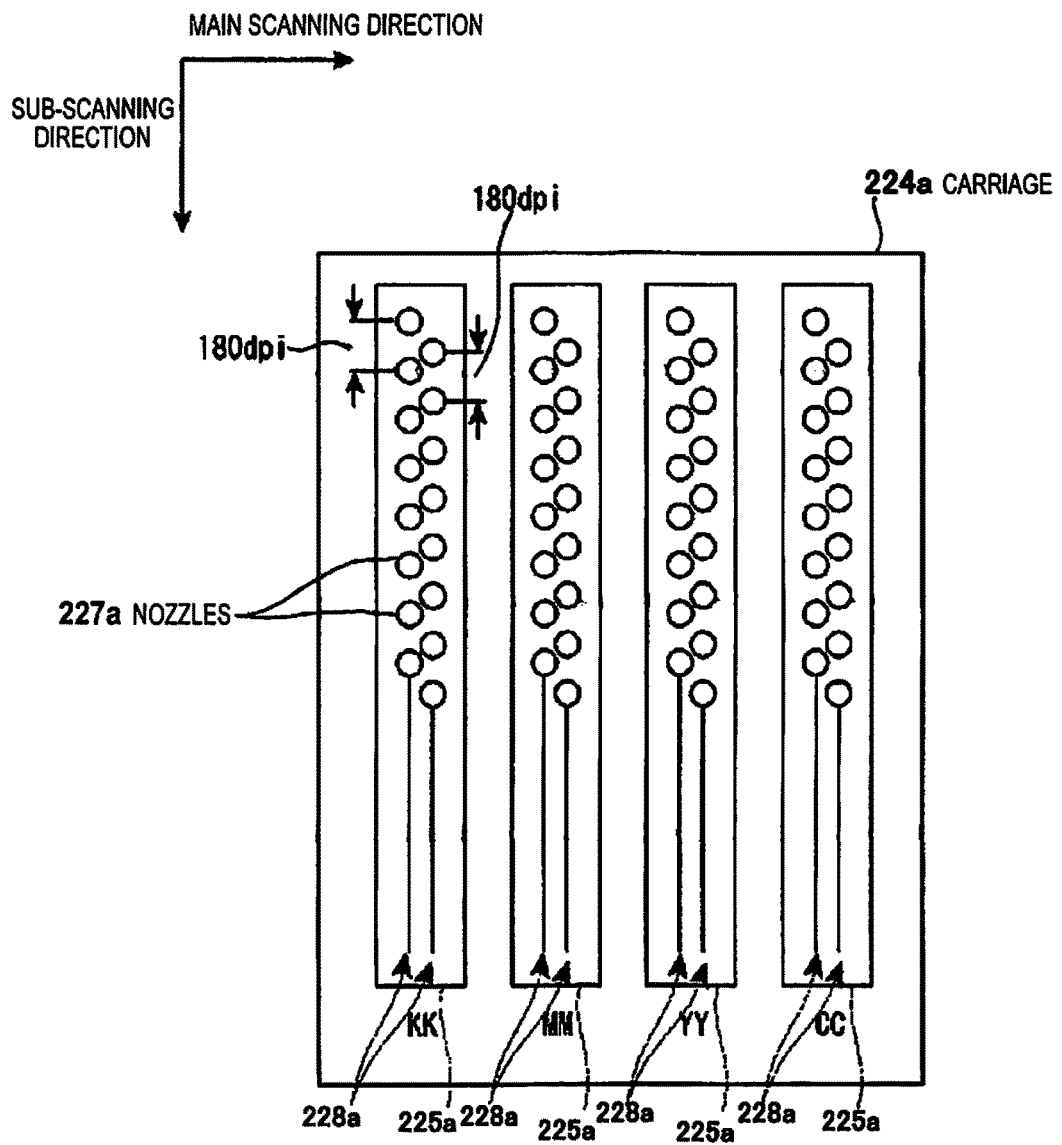

FIG. 13 is a plan view of the printhead 225a from the nozzle face side. In this example, the printhead 225a has a plurality of nozzles 227a corresponding to the colors black (K), magenta (M), yellow (Y), and cyan (C) arranged in nozzle rows 228a corresponding to each color in the sub-scanning direction (the conveyance direction of the print medium). In this example, each nozzle row 228a comprises 180 nozzles 227a in a zigzag patter at a pitch of 180 dpi (dots per inch).

The printheads 225 are arranged in the order K-M-Y-C in the main scanning direction (direction of carriage 224a movement), eject ink in the order K-M-Y-C on the outbound pass, and eject ink in the order C-Y-M-K on the return pass. Because the ink ejection order differs on the outbound pass and return pass, the order in which the inks are applied changes, and color reproduction is different on the outbound pass and return pass. Therefore, if the same color conversion process is applied in both directions, color differences (mottling) may appear between areas printed on the outbound pass and areas printed on the return pass. In the color conversion process, this embodiment of the invention therefore uses two color conversion tables (outbound LUT 125a and return LUT), for outbound printing and return printing.

The sub-scanning unit 222a is a device that conveys the print medium 229a in the sub-scanning direction. The sub-scanning unit 222a has a paper feed motor 226a for moving the print medium 229a synchronized to the operation of the printhead 225a.

Figure 14:
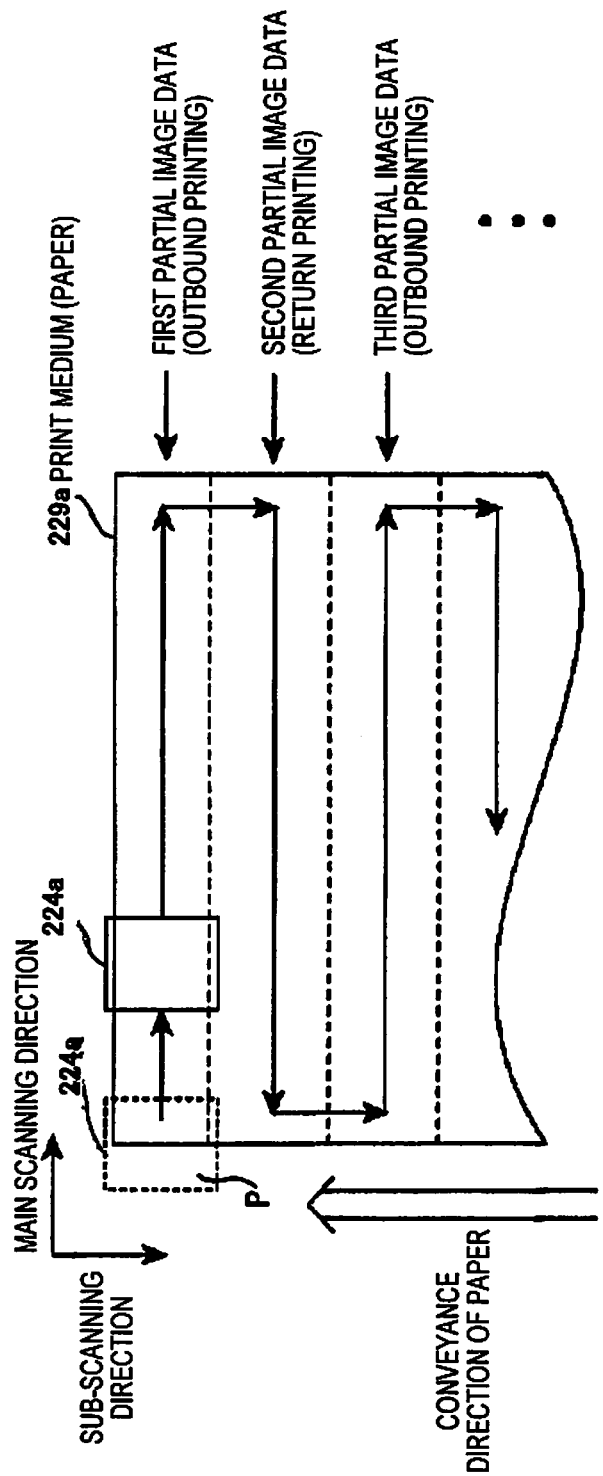

FIG. 14 illustrates the operation of the carriage 224a relative to the print medium 229a. FIG. 14 shows the relative positions of the print medium 229a and carriage 224a with the carriage 224a moving in the direction of the arrows in the figure relative to the print medium 229a. The printer 2a prints while moving the carriage 224a in the main scanning direction from the start printing position P (home position) indicated by the dotted line. When printing to the end of the print image ends, the printer 2a stops movement of the carriage 224a, advances the paper in the sub-scanning direction, and continues printing while moving the carriage 224a to the start printing position P side. When printing to the end of the print image ends, the printer 2a again stops moving the carriage 224a, and after advancing the paper in the sub-scanning direction, and continues printing while moving the carriage 224a in the main scanning direction.

The printer 2a thus prints while repeating printing in the main scanning direction and the paper conveyance operation in the sub-scanning direction. In this example, printing while the carriage 224a moves to the right in the main scanning direction relative to the sub-scanning direction is referred to as "outbound printing," and printing while moving to the left in the main scanning direction is referred to as "return printing." The image data for one pass, which is equal to the image printed in the area that is printed during one outbound printing pass or return printing pass is referred to below as "partial image data."

More specifically, the first unit of partial image data (first partial image data) is printed on the first outbound printing pass. The second unit of partial image data (second partial image data) is then printed on the following return printing pass, and the third unit of partial image data (third partial image data) is then printed on the following outbound printing pass. Odd numbered partial image data is thus printed during outbound printing, and even numbered partial image data is printed during return printing. When printing the entire image is completed, the carriage 224a is moved to the start printing position P and then waits for the next print command.

A printing system 100a according to this embodiment is configured as described above.

Figure 15:
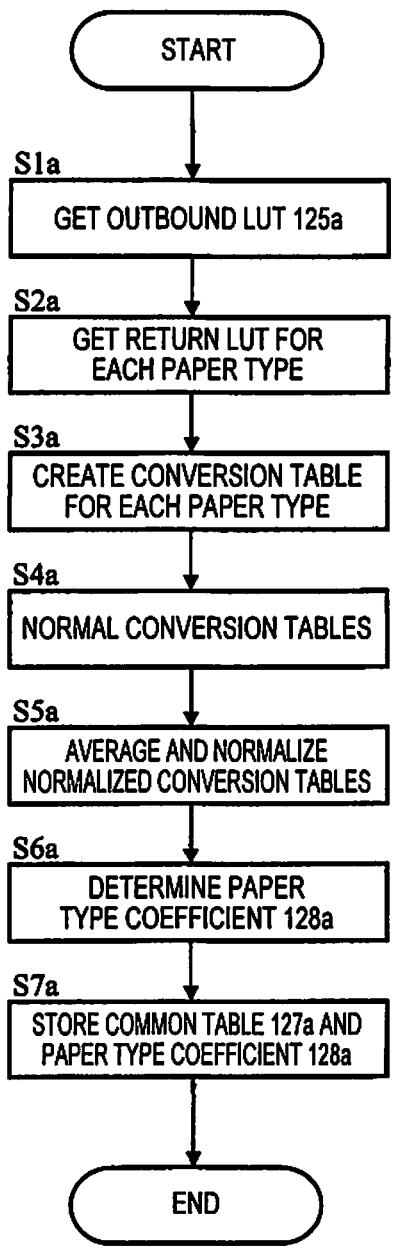

The process of generating the common table 127a is described next. The common table 127a is generated by the manufacturer of the printer 2a, for example, before the printer 2a is shipped. The common table 127a is generated using a computer that executes a common table generating program and processes defined by the program. Below, the computer with the common table generating program is referred to as the common table generator. FIG. 15 is a flow chart of steps in the process generating the common table 127a.

First, the operation of the common table generator (the generator of the common table 127a) inputs the outbound LUT 125a data to the common table generator. Based on the input, the common table generator acquires the outbound LUT 125a (step S1a in FIG. 15). FIG. 16 and FIG. 17 are used to describe the process of generating the common table 127a. For simplicity, FIG. 16 and FIG. 17 show data for color conversion tables having three grid points and three paper types (paper types A, B, C).

Next, the operator generates return LUTs (referred to below as paper-type return LUT; fourth color conversion information) optimized for multiple paper types (three types in FIG. 16 and FIG. 17), and inputs that data to the common table generator. Based on this input, the common table generator acquires the paper-type return LUTs (step S2a in FIG. 15). Note that a paper-type return LUT is a LUT adjusted to minimize color differences between outbound printing and return printing when print media of the corresponding paper type is used for printing.

FIG. 16(a) illustrates the acquired outbound LUT 125a. Because the outbound LUT 125a is common to all paper types, the outbound LUT 125a has the same color conversion information for each paper type A, B, C. FIG. 16(b) shows examples of a paper-type return LUT for each paper type. In FIGS. 16(a) and (b), the C, M, Y, K values in each table indicate the amount of ink of each color assigned to the corresponding grid point (grid point number).

Next, the common table generator generates a conversion table (conversion information) for each paper type (step S1a in FIG. 15). The conversion table is a table for converting the outbound LUT 125a to a paper-type return LUT, that is, is a table storing, for each color value in the paper-type return LUT, the ratio for each color value stored in the outbound LUT 125a.

Therefore, the common table generator stores each color value in the acquired paper-type return LUT divided by the corresponding color value in the acquired outbound LUT 125a as the values in the conversion table for each paper type. If in each table the values of C, M, Y, K at grid point number i are Cio, Mio, Yio, Kio in the outbound LUT 125a; Cik, Mik, Yik, Kik in the paper-type return LUT; and Cih, Mih, Yih, Kih in the conversion table; the common table generator calculates the values in the conversion table from equations (1) to (4) below.

$$Cih = Cik \div Cio \quad (1)$$

$$Mih = Mik \div Mio \quad (2)$$

$$Yih = Yik \div Yio \quad (3)$$

$$Kih = Kik \div Kio \quad (4)$$

FIG. 16(c) shows conversion tables generated for each paper type. For example, as described above, the value of 2.5 for C at grid point number 1 in the conversion table for paper type A equals the value of 12.5 for C at grid point number 1 in the corresponding paper-type return LUT (FIG. 16(b)) divided by the value of 5.0 for C at grid point number 1 in the outbound LUT 125a (FIG. 7 (A)).

Next, the common table generator normalizes the conversion table to create a conversion table that was normalized (referred to below as a normalized conversion table) (step S4a in FIG. 15). The process of normalizing the conversion table is done as follows. First, the maximum (Max) and minimum (Min) values stored for each color at grid point number are obtained. Next, the value stored in the normalized conversion table for each color is acquired from the following equation (5).

$$yi = (xi - \text{Min})/(\text{Max} - \text{Min}) \quad (5)$$

where xi is the value stored for grid point number i in the conversion table, and yi is the value stored for grid point number i in the normalized conversion table. The yi values obtained from equation (5) range from 0 to 1.

FIG. 17(a) shows examples of normalized conversion tables.

Next, the common table generator applies an averaging process and normalization process to the normalized conversion table for each paper type to create a common table (step S5a in FIG. 15). In the averaging process, the common table generator calculates the average of the values stored at the same location (same grid point number and same color) in the normalized conversion table of each paper type, and creates an average conversion table storing the calculated averages at the same location.

In the normalization process, the common table generator applies the same normalization process as in step S4a to the average conversion tables that are created, and saves the resulting table as the common table 127a.

FIG. 17(b) shows an example of a common table 127a that is created.

Next, the common table generator determines the paper type coefficients 128a for each paper type using data used to generate the common table 127a (step S6a in FIG. 15). The paper type coefficient 128a is the coefficient used to convert the common table 127a to the individual conversion table for each paper type (a table such as shown in FIG. 16(c)), and as described above comprises a ratio (α1) and offset (α2). The paper type coefficient 128a is determined by a specific mathematical method for each paper type and each color. The paper type coefficient 128a can be roughly determined by equation (6).

$$Y = X \times \alpha 1 + \alpha 2 \quad (6)$$

where X is the value stored in the common table 127a, and Y is the value stored in the conversion table at the same position as X (same grid point number, same color).

FIG. 17(c) shows examples of the paper type coefficients 128a determined for paper types A, B, and C.

Next, the common table generator or the operator stores the common tables 127a that were generated and the paper type coefficients 128a that were determined in the storage 129a of the host computer 1a (step S7a in FIG. 15).

As described above, a common table 127a is created and can be used in the printing process. Note that determining the paper type coefficients 128a in step S6a, and storing the paper type coefficients 128a in step S7a, may be omitted.

Figure 18:
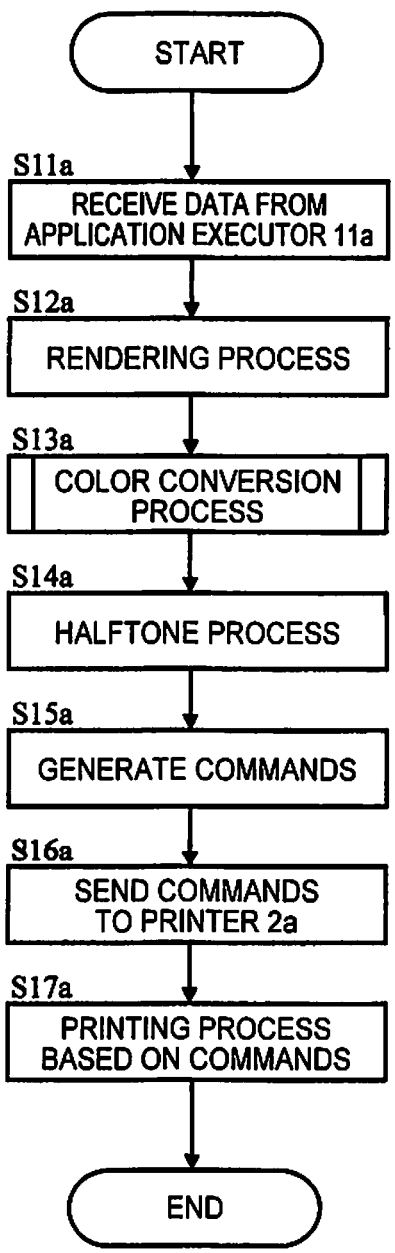

Processes of the printing system 100a according to this embodiment are described next. FIG. 18 is a flow chart showing an example of a process of the printing system 100a. When a print request is asserted by the application executor 11a, the printer driver 12a receives the print request including the original image data (step S11a in FIG. 18). Note that information about the type of the print medium used in the printer 2a (referred to below as the paper type identifier) is included in the print request as a print condition.

The received print request information is passed to the rendering unit 121a, and the rendering unit 121a executes a rendering process on the original image data contained in the print request to generate RGB pixel data (step S12a in FIG. 18).

The print request including the generated RGB pixel data is passed to the color converter 122a, and the color converter 122a then executes the color conversion process and converts the RGB pixel data to CMYK pixel data (step S13a in FIG. 18). In this color conversion process, the color converter 122a, using the outbound LUT 125a, common table 127a, and paper type coefficient, generates a return LUT (second color conversion information) for the paper type that is used, and using the generated return LUT executes a process appropriate to the paper type. The specific content of the color conversion process is described below.

The print request including the generated CMYK pixel data is passed to the halftone processor 123a, and the halftone processor 123a executes a halftone process on the CMYK pixel data and converts the CMYK pixel data to dot data (step S14a in FIG. 18).

The print request including the generated dot data is then passed to the command generator 124a, and the command generator 124a generates print data expressing the print request with commands for the printer 2a (step S15a in FIG. 18).

The host computer 1a sends the generated print data to the printer 2a (step S16a in FIG. 18).

The printer 2a receives the print data, and executes a printing process according to the commands contained in the print data (step S17a in FIG. 18). More specifically, the controller 21a interprets the commands, and controls the main scanning unit 221a and sub-scanning unit 222a of the print mechanism 22a based on the interpreted result. The print mechanism 22a operates as controlled, and by the bidirectional operation of the printhead 225a, ejects ink and prints on the print medium indicated by the paper type identifier.

The process from requesting printing to printing is thus executed.

Figure 19:
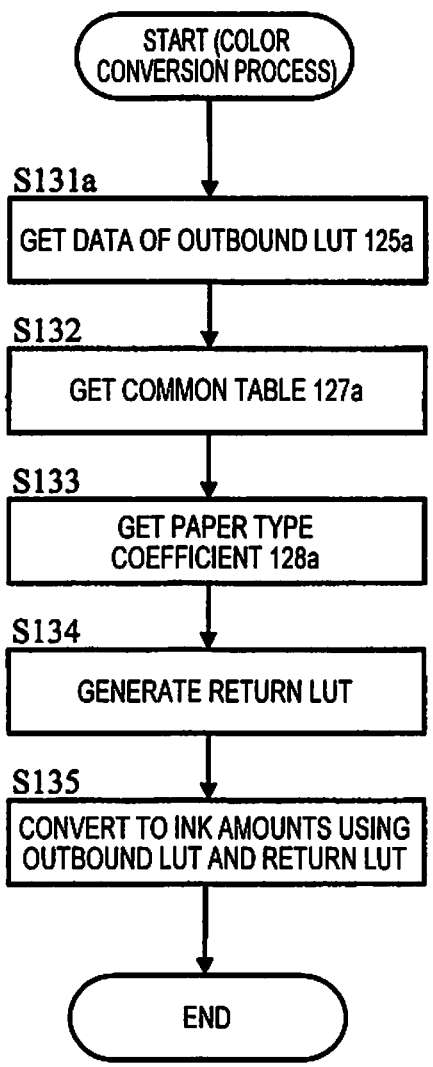

FIG. 19 is a flow chart of steps in the color conversion process of the color converter 122a (step S13a in FIG. 18). The content of the color conversion process is described below with reference to FIG. 19.

First, the color converter 122a acquires the data of the outbound LUT 125a stored in the storage 129a (step S131a in FIG. 19). Next, the color converter 122a acquires the data of the common table 127a stored in the storage 129a (step S132a in FIG. 19).

Next, the color converter 122a accesses the paper type coefficients 128a stored in the storage 129a, and determines whether or not paper type coefficients corresponding to the paper type identifier contained in the print request are stored. If the paper type coefficients are stored, the color converter 122a acquires the paper type coefficients (step S133a in FIG. 19). If the paper type coefficients are not stored, the color converter 122a displays, on the display device (not shown in the figure) of the host computer 1a, a prompt to input the paper type coefficients. If the paper type coefficients are input to the display, the color converter 122a acquires the input paper type coefficients (step S133a in FIG. 19). Note that when inputting the paper type coefficients, the user of the printing system 100a first determines the type of paper to be used.

Next, using the acquired outbound LUT 125a, common table 127a, and paper type coefficients, the color converter 122a generates a return LUT (second color conversion information) appropriate to the paper type specified by the paper type identifier (step S134a in FIG. 19).

More specifically, the color converter 122a, using the common table 127a and paper type coefficients, first generates a conversion table for the paper type based on equation (6). Next, the color converter 122a applies the generated conversion table to the outbound LUT 125a to generate the return LUT (second color conversion information).

If the values of C, M, Y, K at grid point number i in the return LUT that is generated, outbound LUT 125a, and conversion table are Cik, Mik, Yik, Kik in the return LUT; Cio, Mio, Yio, Kio in the outbound LUT 125a; and Cih, Mih, Yih, Kih in the conversion table; the color converter 122a calculates the values in the return LUT from equations (7) to (10) below.

$$Cik = Cio \times Cih \quad (7)$$

$$Mik = Mio \times Mih \quad (8)$$

$$Yik = Yio \times Yih \quad (9)$$

$$Kik = Kio \times Kih \quad (10)$$

Next, using the outbound LUT 125a and generated return LUT, the color converter 122a converts the RGB pixel data to CMYK pixel data (step S135a in FIG. 19). In the color conversion process, the color converter 122a generates CMYK pixel data using the outbound LUT 125a (first color conversion information) for the RGB pixel data used for outbound printing, and for the RGB pixel data used for return printing, generates CMYK pixel data using the return LUT (second color conversion information). More specifically, for each pixel in the RGB pixel data, the color converter 122a converts the R, G, B values of the pixel to the C, M, Y, K values stored at that grid point in the color conversion table if that R, G, B value is a grid point in the color conversion table (outbound LUT 125a or return LUT); and if that R, G, B value is not a grid point in the color conversion table, converts the R, G, B values to C, M, Y, K values by the interpolation process described above using the C, M, Y, K values stored for the surrounding grid points.

In this way, a LUT that is equivalent (close to) a paper-type return LUT adjusted for the type of paper used to minimize the color differences between outbound printing and return printing is used for return printing.

The color conversion process is executed as described above. Note that the paper type used for printing contained in the print request is a standard paper type, and when the storage 129a stores a return LUT 126a for the standard paper type (third color conversion information), the color converter 122a executes the color conversion process for return printing using the stored return LUT 126a instead of generating a return LUT.

What the host computer 1a must have in this embodiment are the three outbound LUT 125a, return LUT 126a, and common table 127a, or the three outbound LUT 125a, common table 127a, and paper type coefficients 128a for the standard paper type.

Furthermore, the values stored in the conversion table are expressed as a ratio of the color value in the embodiment described above, but may be expressed as a color value difference. In this case, the common table is also a table storing color value difference values.

Furthermore, the conversion table may be generated as a conversion table expressing the difference between the paper-type return LUT and the return LUT 126a of the standard paper type. By the same method described above, a common table expressing, as a common tendency independent of the paper type, the difference to the return LUT 126a of the standard paper type is first created. When printing, the return LUT appropriate to the type of paper used is generated from the return LUT 126a of the standard paper type, the generated common table, and the previously defined paper type coefficients, and used in the color conversion process.

The color conversion process is also executed on the host computer 1a side in the printing system 100a according to this embodiment, but may be executed on the printer 2a side.

Furthermore, the color conversion table is adjusted using the paper type as the printing condition in this embodiment, but the color conversion table may be adjusted according to other printing conditions, including temperature and humidity.

As described above, because a common table 127a expressing common tendencies of the difference (color difference) between outbound printing and return printing that are independent of the paper type is previously defined, and the user simply inputs a paper type coefficient for the type of paper used, the image processing device of the printing system according to this embodiment and variations thereof can easily suppress color differences between outbound printing and return printing passes when printing.

Furthermore, the common table 127a is information accurately reflecting common tendencies as described above because data related to multiple paper types is normalized and the data is then averaged.

Note that the foregoing embodiment describes a color conversion process from RGB color space to CMYK color space, the invention can also be applied to color conversion processes for converting between other color spaces.

Embodiment 3

Figure 20:
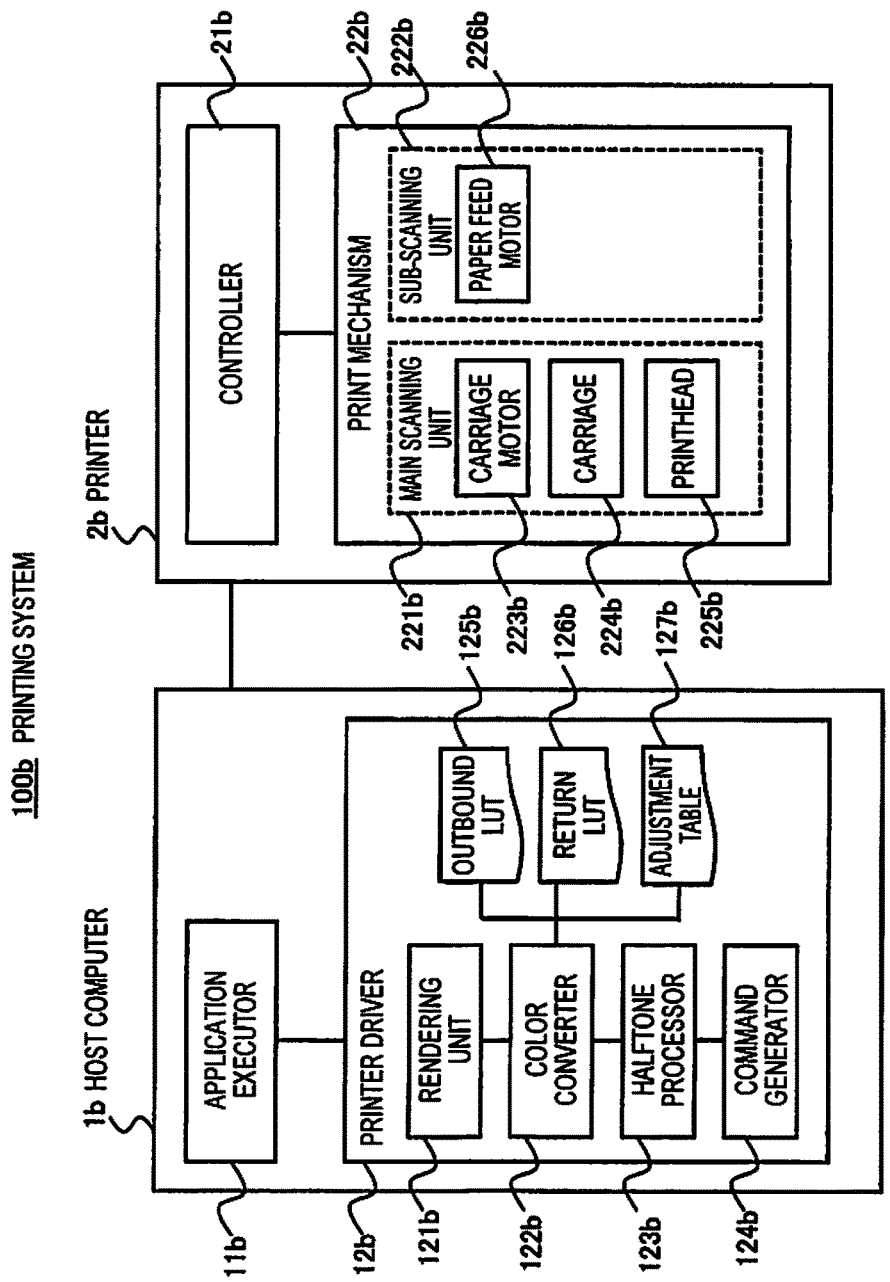
FIG. 20 illustrates a third embodiment of a printing system including an image processing device according to the invention.

FIG. 20 illustrates the configuration of a variation of a printing system including an image processing device according to the invention. The printer driver 12b shown in FIG. 20 is an example of the image processing device according to the invention. In the color conversion process executed in the process of generating print data for a printer 2b that prints bidirectionally (prints in two directions), the printer driver 12b adjusts a lookup table (color conversion table) used in the color conversion process for the return pass according to the paper type based on an outbound pass color conversion table (outbound LUT 125b) and a return pass color conversion table (return LUT 126b), and uses the generated lookup table in the color conversion process applied to the return pass. As a result of this process, color differences between outbound printing and return printing passes produced by the printer 2b due to the paper type can be reduced.

As shown in FIG. 20, the printing system 100b according to this embodiment includes a host computer 1b and a printer 2b, which is a color inkjet printer that prints bidirectionally.

The host computer 1b is a host device of the printer 2b and instructs the printer 2b to print, and is, for example, a personal computer. Furthermore, while not shown in the figures, the host computer 1b has a CPU, RAM, ROM, HDD, display (display device), and operating device (command device).

As shown in FIG. 20, the functional configuration of the host computer 1b includes an application executor 11b and a printer driver 12b.

The application executor 11b is the originator of print requests to the printer 2b, and sends image data to be printed (referred to below as the original image data) to the printer driver 12b based on the user inputting commands to the host computer 1b. The original image data is data in a standard format (such as a GDI (Graphic Data Interface)-compliant format) that expresses text, graphics and other print content by object unit. In the original image data, image colors are expressed as gradations of (such as 256 gray scale values of 0-255) RGB (red, green, and blue) values, for example. Note that the application executor 11b is embodied by a program describing process content, and hardware, such as a CPU and RAM, for example, that executes processes according to the program.

The printer driver 12b handles the driver function for the printer 2b, processes the original image data output from the application executor 11b to generate print data for the printer 2b, and sends the print data to the printer 2b. The printer driver 12b is embodied by a driver program describing the process content, a CPU that executes processes according to the program, data used in the processes, and memory storing the driver program and data.

As shown in FIG. 20, the functional configuration of the printer driver 12b includes a rendering unit 121b, color converter 122b, halftone processor 123b, command generator 124b, outbound LUT 125b, return LUT 126b, and adjustment table ($\alpha$ table) 127b.

The rendering unit 121b applies a rendering process to the original image data output from the application executor lib, and converts the original image data to pixel unit image data. More specifically, the rendering unit 121b converts the original image data to image data in which each pixel is expressed as an RGB gradation (for example, one of 256 gray scale values ranging from 0 to 255). The resulting pixel unit image data is referred to below as RGB pixel data.

The color converter 122b executes a process (color conversion process) that converts the RGB pixel data generated by the rendering unit 121b to color data (referred to below as CMYK pixel data) expressed by the colors of ink used by the printer 2b (in this example, CMYK (cyan, magenta, yellow, black)). The CMYK pixel data is ink volume data representing each pixel as a CMYK gradation (for example, 256 gray scale values ranging from 0 to 255). The CMYK image data is data expressing the volume of each color of ink used in the printer 2b.

As described above, the color converter 122b adjusts for a specific printing condition, such as the type of paper (paper type) used as the print medium in the printer 2b, in the color conversion process for printing on the return pass of the printer 2b, and this process is a feature of the printing system according to the invention. The specific content of the color conversion process, including this adjustment process, is described further below.

The halftone processor 123b executes a halftone process that converts the pixel unit image data to image data expressed by the presence of a printed dot. In this embodiment, the halftone processor 123b converts the CMYK pixel data to data (referred to below as dot data) expressing what CMYK dots are printed for each pixel. A printed dot is a dot that is formed by the printer 2b ejecting ink onto the print medium (paper), and in this example multiple different sizes of dots, large, medium, and small, are used. The dot data in this example includes, for each position on the print medium to which ink is ejected, information indicating for each color whether or not a large dot is formed, a medium dot is formed, or a small dot is formed.

The command generator 124b expresses print requests including the image data to be printed as commands for the printer 2b. The print requests generated by the command generator 124b are sent as the print data from the host computer 1b to the printer 2b. The command generator 124b, when generating a print request (print data), includes the dot data in the print data by means of commands for the printer 2b.

The outbound LUT 125b (first LUT, first color conversion information) and return LUT 126b (second LUT, second color conversion information) are, respectively, a color conversion table (color conversion information) for outbound printing, and a color conversion table for return printing, in the printer 2b. A color conversion table is a table storing data for converting the color expression of the image data output from the application executor 11b to a color expression using the colors of ink used in the printer 2b, and more specifically is a table for the color conversion process of the color converter 122b. In this embodiment of the invention the color conversion table is for converting color expressions in the RGB color space to color expressions in the CMYK color space.

The color conversion table stores information for distributing the color values (R, G, B) in a three-dimensional color space expressed by 8 bits (256 levels) for each color, R, G, B to the color values (C, M, Y, K) in a four-dimensional color space expressed by 8 bits (256 levels) for each color C, M, Y, K. By using the color conversion table, a desired color in the RGB space can be expressed by CMYK values. However, because the amount of data required to map every possible color (approximately 16.77 million colors) expressed by 8 bits (256 levels) to the corresponding color is massive, the color conversion table actually only stores data for a specific number of gradations n that is less than 256 gradations.

Figure 21:
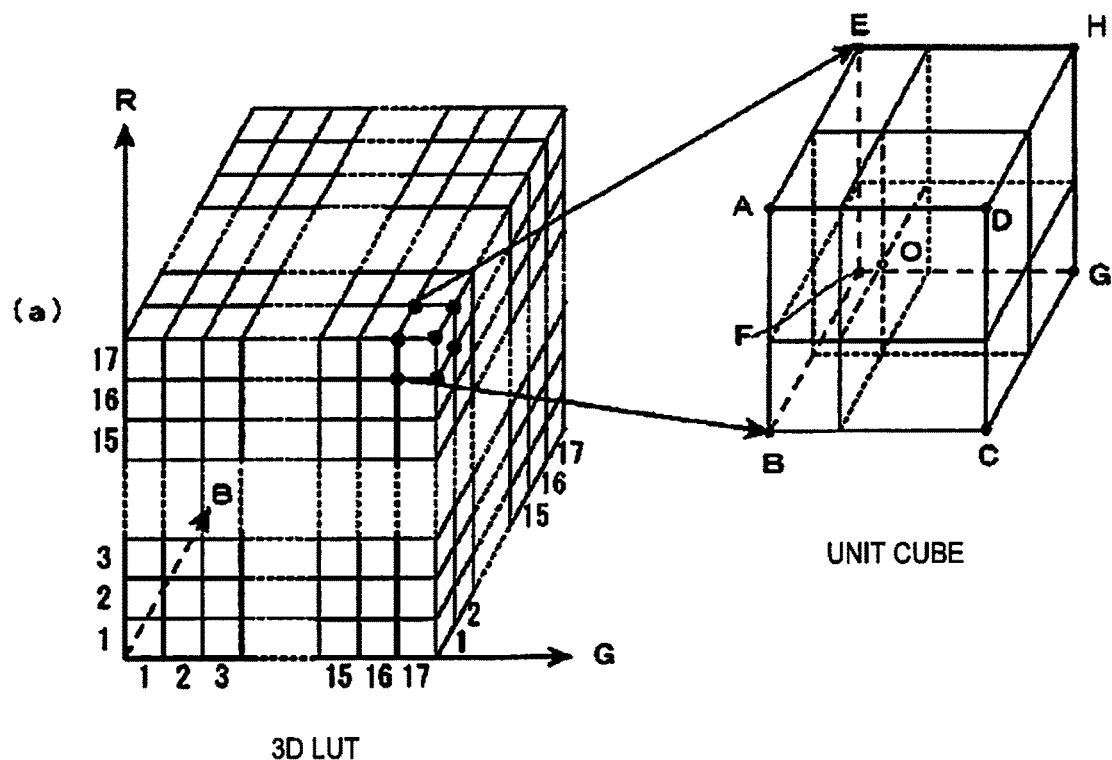
FIG. 21 illustrates a three-dimensional color conversion table.

FIG. 21 shows an example of a color conversion table in three-dimensional space. The example in FIG. 21(a) expresses each RGB color in 18 gradations (n=18), and the color conversion table assigns a CMYK value (C, M, Y, K) to the RGB value (R, G, B) of each of the 17 squares on each RGB axis in the RGB color space.

If a color to be converted is not on the grid, the color converter 122b calculates the corresponding CMYK values using a suitable interpolation method such as tetrahedral interpolation. In this case, to convert the color at point O in FIG. 21(a), for example, the CMYK values for point O can be obtained from the CMYK values (FIG. 21(b)) corresponding to the eight grid points (A to H) of the unit cube containing point O.

Note that the outbound LUT 125b and return LUT 126b respectively contain data adjusted to minimize differences in the colors printed in the printer 2b on the outbound printing and return printing passes under a first printing condition, such as when using a print medium of a specific paper type (referred to below as the standard paper type). The outbound LUT 125b and return LUT 126b are stored in a ROM or hard disk drive device, for example.

The α table 127b is a table storing coefficient α, which is the adjustment value, for the printing condition. In this example, the α table 127b relationally stores, for each paper type (printing condition) of print media used by the printer 2b, a paper type identifier and a coefficient α for that paper type. Coefficient α is a coefficient for generating a color conversion table (third LUT, third color conversion information) adjusted to minimize the difference between colors printed during outbound printing and return printing when print media of the paper type corresponding to the coefficient α is used in the printer 2b (under a second printing condition). As described further below, the color converter 122b generates third color conversion information from the outbound LUT 125b (first color conversion information) and return LUT 126b (second color conversion information) for a first printing condition (standard paper type), and coefficient α, and uses the third color conversion information in the color conversion process.

Figure 22:
FIG. 22 shows an example of an α table 127b.

FIG. 22 illustrates an example of an α table 127b. In the example in FIG. 22, the coefficients α of 1.0, 0.8, and 1.4 are stored for the paper types AA, BB, and CC. In this example paper type AA is a standard paper type (first print condition).

Paper types include, for example, plain paper, glossy paper, synthetic paper, matte paper, and handmade paper, and different manufacturers make different types of even plain paper. Note that a desirable value for each coefficient α is previously determined from tests using actual printed output, for example. The α table 127b is also stored in ROM or HDD, for example.

The printer 2b is a color inkjet printer that executes a printing process based on print commands from the host computer 1b. The printer 2b prints by synchronizing operation of the printhead 225b, which has nozzles that eject ink (color material) onto the print medium, in the main scanning direction, and the operation advancing the paper, which is the print medium, in the sub-scanning direction, and prints bidirectionally (in two directions) by ejecting ink in both directions of printhead 225b operation.

As shown in FIG. 20, the printer 2b has a controller 21b and a print mechanism 22b.

The controller 21b receives print data with the print commands, and causes the print mechanism 22a to execute a printing process according to the print data. The controller 21b is embodied by programs containing process content, a CPU that executes processes according to the programs, RAM, ROM that stores the programs, or ASIC, for example.

The print mechanism 22b executes a printing process on the print medium (paper) as instructed by the controller 21b. As shown in FIG. 20, the print mechanism 22b has a main scanning unit 221b and sub-scanning unit 222b.

The main scanning unit 221b has a printhead 225b with nozzles 227b that eject CMYK color inks, a carriage 224b that carries and moves the printhead 225b in the main scanning direction, and a carriage motor 223b for moving the carriage 224b.

Figure 23:
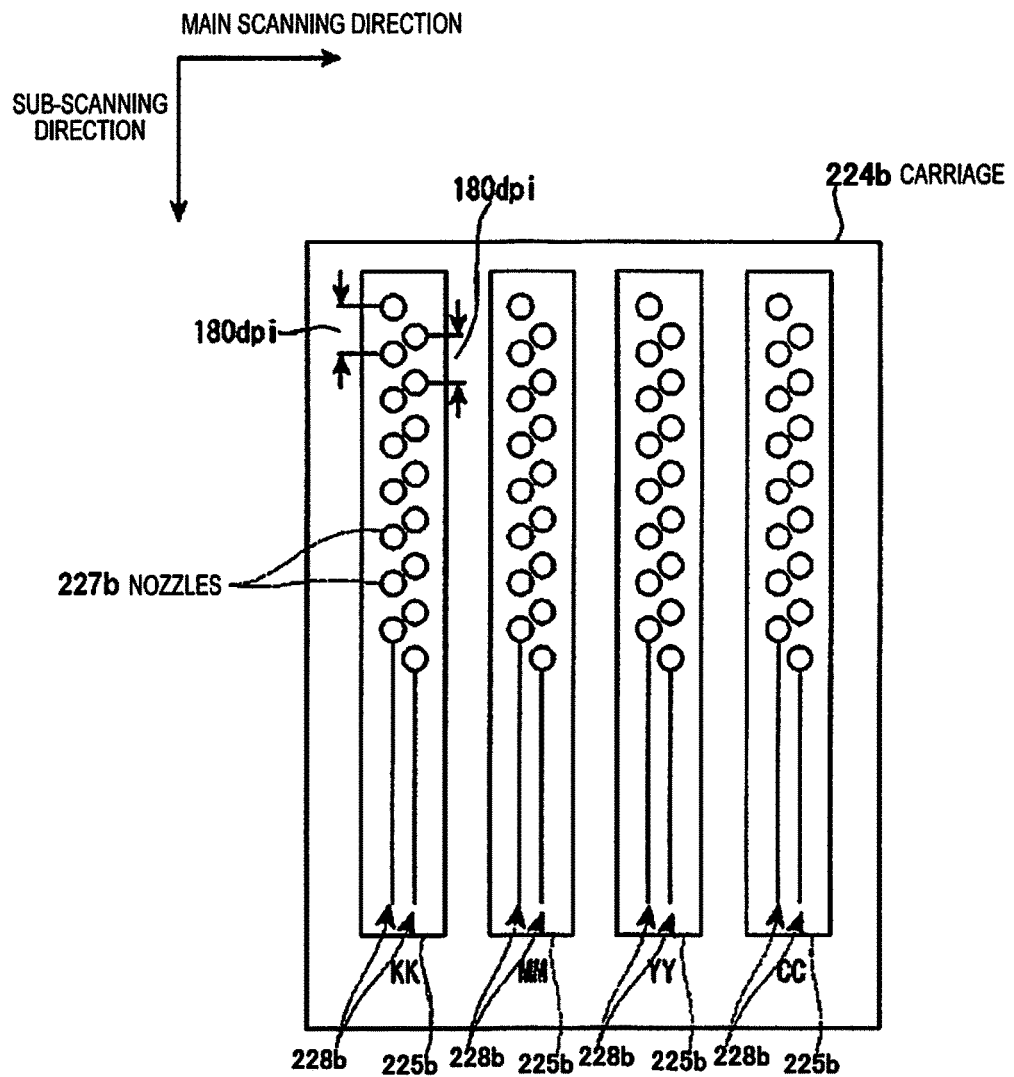
FIG. 23 illustrates the configuration of the carriage 224b.

FIG. 23 is a plan view of the printhead 225b from the nozzle face side. In this example, the printhead 225b has a plurality of nozzles 227b corresponding to the colors black (K), magenta (M), yellow (Y), and cyan (C) arranged in nozzle rows 228b corresponding to each color in the sub-scanning direction (the conveyance direction of the print medium). In this example, each nozzle row 228b comprises 180 nozzles 227b in a zigzag patter at a pitch of 180 dpi (dots per inch).

The printheads 225 are arranged in the order K-M-Y-C in the main scanning direction (direction of carriage 224b movement), eject ink in the order K-M-Y-C on the outbound pass, and eject ink in the order C-Y-M-K on the return pass. Because the ink ejection order differs on the outbound pass and return pass, the order in which the inks are applied changes, and color reproduction is different on the outbound pass and return pass. Therefore, if the same color conversion process is applied in both directions, color differences (mottling) may appear between areas printed on the outbound pass and areas printed on the return pass. In the color conversion process, this embodiment of the invention therefore uses two color conversion tables (outbound LUT 125b and return LUT), for outbound printing and return printing. In addition, when a first LUT and second LUT are used, color differences can be reduced under a first printing condition, but reducing color differences may not be possible under a second printing condition. In this event, a third LUT is used as described above. In this embodiment, there is a difference in ink characteristics based on the type of paper under the first printing condition and second printing condition.

The sub-scanning unit 222b is a device that conveys the print medium 229b in the sub-scanning direction. The sub-scanning unit 222b has a paper feed motor 226b for moving the print medium 229b synchronized to the operation of the printhead 225b.

Figure 24:
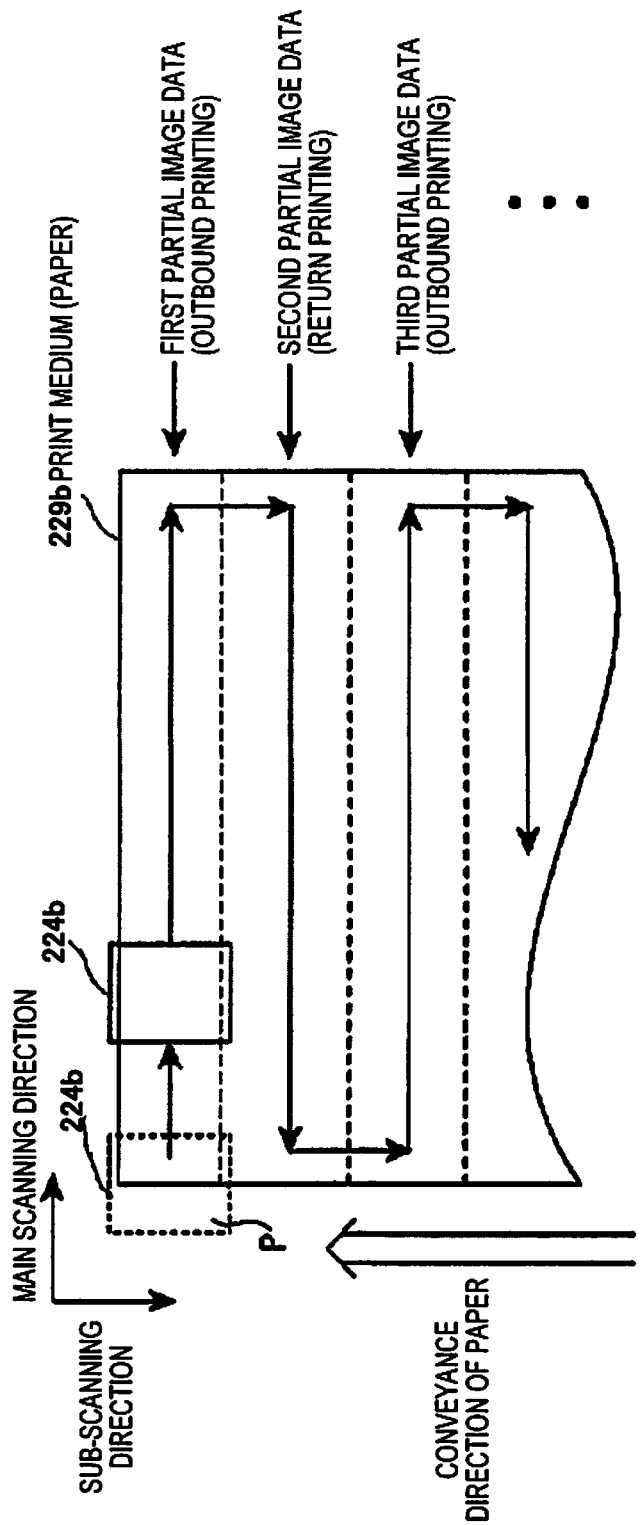
FIG. 24 illustrates the operation of the carriage 224b relative to the print medium (paper) 229b.

FIG. 24 illustrates the operation of the carriage 224b relative to the print medium 229b. FIG. 24 shows the relative positions of the print medium 229b and carriage 224b with the carriage 224b moving in the direction of the arrows in the figure relative to the print medium 229b. The printer 2b prints while moving the carriage 224b in the main scanning direction from the start printing position P (home position) indicated by the dotted line. When printing to the end of the print image ends, the printer 2b stops movement of the carriage 224b, advances the paper in the sub-scanning direction, and continues printing while moving the carriage 224b to the start printing position P side. When printing to the end of the print image ends, the printer 2b again stops moving the carriage 224b, and after advancing the paper in the sub-scanning direction, and continues printing while moving the carriage 224b in the main scanning direction.

The printer 2b thus prints while repeating printing in the main scanning direction and the paper conveyance operation in the sub-scanning direction. In this example, printing while the carriage 224b moves to the right in the main scanning direction relative to the sub-scanning direction is referred to as "outbound printing," and printing while moving to the left in the main scanning direction is referred to as "return printing." The image data for one pass, which is equal to the image printed in the area that is printed during one outbound printing pass or return printing pass is referred to below as "partial image data."

More specifically, the first unit of partial image data (first partial image data) is printed on the first outbound printing pass. The second unit of partial image data (second partial image data) is then printed on the following return printing pass, and the third unit of partial image data (third partial image data) is then printed on the following outbound printing pass. Odd numbered partial image data is thus printed during outbound printing, and even numbered partial image data is printed during return printing. When printing the entire image is completed, the carriage 224b is moved to the start printing position P and then waits for the next print command.

Processing is executed as described below in the printing system 100b according to the embodiment of the invention configured as described above.

Figure 25:
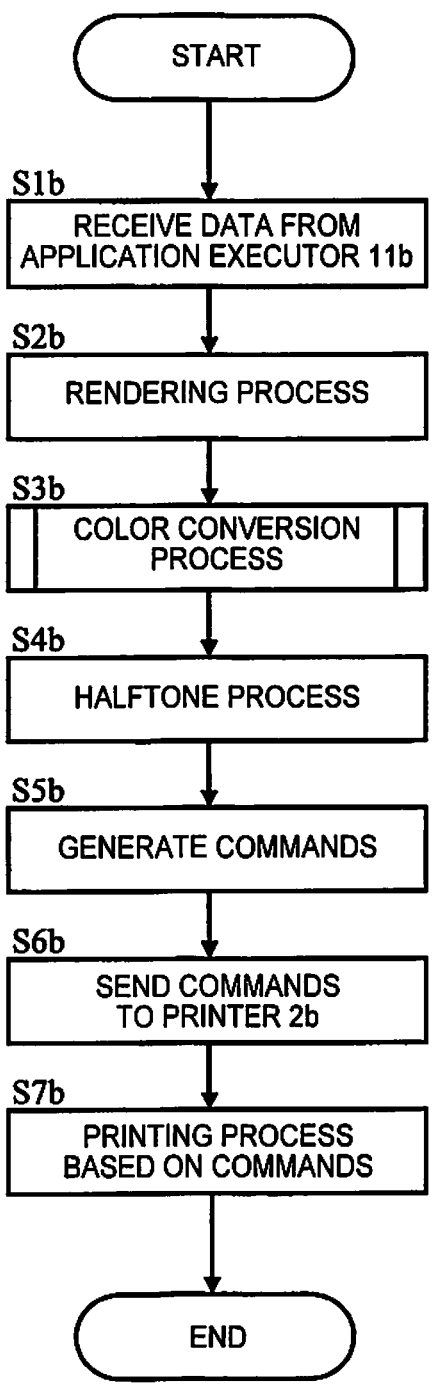
FIG. 25 is a flow chart of steps in a process of the printing system 100b.

FIG. 25 is a flow chart showing an example of the process of the printing system 100b. When a print request is asserted by the application executor 11b, the printer driver 12b receives the print request including the original image data (step S1b in FIG. 25). Note that information about the type of the print medium used in the printer 2b (referred to below as as the paper type identifier) is included in the print request as a print condition.

The received print request information is passed to the rendering unit 121b, and the rendering unit 121b executes a rendering process on the original image data contained in the print request to generate RGB pixel data (step S2b in FIG. 25).

The print request including the generated RGB pixel data is passed to the color converter 122b, and the color converter 122b then executes the color conversion process and converts the RGB pixel data to CMYK pixel data (step S3b in FIG. 25). In this color conversion process, the color converter 122b generates a third LUT (third color conversion information) for the return pass using the outbound LUT (first color conversion information), return LUT (second color conversion information), and adjustment table (α table) 127b, and using the third LUT executes a process appropriate to the paper type specified by the paper type identifier. The specific content of the color conversion process is described below.

The print request including the generated CMYK pixel data is passed to the halftone processor 123b, and the halftone processor 123b executes a halftone process on the CMYK pixel data and converts the CMYK pixel data to dot data (step S4b in FIG. 25).

The print request including the generated dot data is then passed to the command generator 124b, and the command generator 124b generates print data expressing the print request with commands for the printer 2 (step S5b in FIG. 25).

The host computer 1b sends the generated print data to the printer 2b (step S6b in FIG. 25).

The printer 2b receives the print data, and executes a printing process according to the commands contained in the print data (step S7b in FIG. 25). More specifically, the controller 21b interprets the commands, and controls the main scanning unit 221b and sub-scanning unit 222b of the print mechanism 22b based on the interpreted result. The print mechanism 22b operates as controlled, and by the bidirectional operation of the printhead 225b, ejects ink and prints on the print medium indicated by the paper type identifier.

The process from requesting printing to printing is thus executed.

Figure 26:
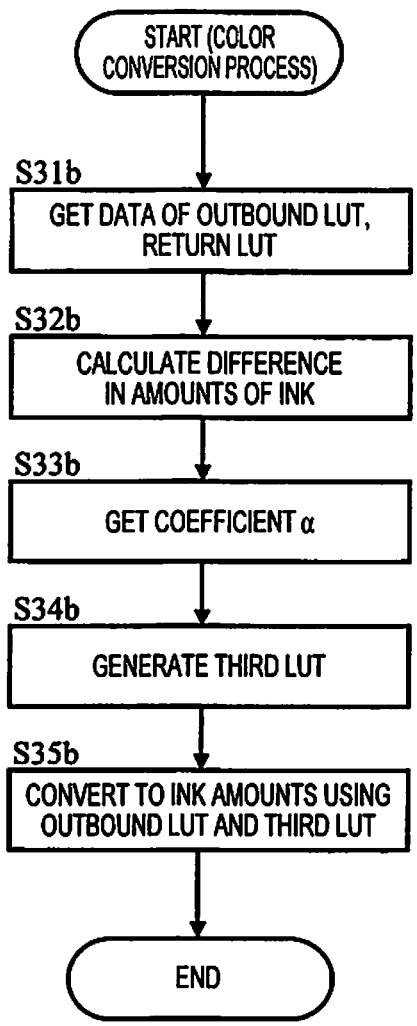
FIG. 26 is a flow chart illustrating steps in the color conversion process.

FIG. 26 is a flow chart of steps in the color conversion process of the color converter 122b (step S3b in FIG. 25).

First, the color converter 122b acquires the data of the outbound LUT 125b and return LUT 126b (step S31b in FIG. 26).

Next, the color converter 122b determines the difference (referred to below as DIF) between the amounts of ink (amounts of colorant) in the outbound LUT 125b and return LUT 126b (step S32b in FIG. 26). More specifically, for each grid point (R, G, B) described above, the color converter 122b calculates the difference of the value of each color (color data) (C, M, Y, K) stored in the return LUT 126b (referred to below as (C2, M2, Y2, K2)) minus the value of each corresponding color (C, M, Y, K) stored in the outbound LUT 125b (referred to below as (C1, M1, Y1, K1)). More specifically, the color converter 122b calculates the values $\Delta C=C2-C1$, $\Delta M=M2-M1$, $\Delta Y=Y2-Y1$, $\Delta K=K2-K1$ for each grid point (R, G, B).

Next, the color converter 122b acquires the value of coefficient α from the α table 127 (step S33b in FIG. 26). More specifically, the color converter 122b reads from the α table 127b the value of the coefficient α stored relationally to the paper type identified by the paper type identifier contained in the print request. In the example in FIG. 22, if the paper type is BB, the color converter 122b acquires the value 0.8 as the value of coefficient α.

Next, the color converter 122b generates third color conversion information for return printing appropriate to the paper type identified by the paper type identifier (step S34b in FIG. 26). The color converter 122b generates the third color conversion information by reflecting the difference in the amounts of ink in the outbound LUT 125b and return LUT 126b on the values of the outbound LUT 125b at a ratio proportional to the value of the acquired coefficient α.

More specifically, the color converter 122b calculates, for each grid point, the (C, M, Y, K) values (referred to below as (C3, M3, Y3, K3)) corresponding to the (R, G, B) values of each grid point in the third color conversion information using the following equations.

$$C3 = C1 + \alpha \times \Delta C$$

$$M3 = M1 + \alpha \times \Delta M$$

$$Y3 = Y1 + \alpha \times \Delta Y$$

$$K3 = K1 + \alpha \times \Delta K$$

Note that the grid points (R, G, B) are the same in the outbound LUT 125*b*, return LUT 126*b*, and third LUT.

Next, the color converter 122*b* converts the RGB pixel data to CMYK pixel data using the outbound LUT 125*b* and third LUT (step S35*b* in FIG. 26). In the color conversion process, the color converter 122*b* generates CMYK pixel data using the outbound LUT 125*b* for the RGB pixel data used for outbound printing, and for the RGB pixel data used for return printing, generates CMYK pixel data using the third LUT. More specifically, for each pixel in the RGB pixel data, the color converter 122*b* converts the R, G, B values of the pixel to the C, M, Y, K values stored at that grid point in the color conversion table if that RGB value is a grid point in the color conversion table (outbound LUT 125*b* or third LUT); and if that RGB value is not a grid point in the color conversion table, converts the R, G, B values to C, M, Y, K values by the interpolation process described above using the C, M, Y, K values of the surrounding grid points.

In this way, a color conversion table (third LUT) that is adjusted according to the type of paper used for printing to minimize color differences between outbound printing and return printing is used for return printing.

The color conversion process is executed as described above. Note that the color converter 122*b* may store the generated third LUT until processing the next print request. In this case, if the paper type specified by the next print request is the same as the paper type used to generate the third LUT, the color converter 122*b* can omit the process of steps S31*b* to S34*b* in the color conversion process applied to the next print request, and the stored third LUT can be used in step S35*b*.

Changing (adjusting) the color conversion table for return printing based on coefficient α is described above, but the color conversion table for outbound printing may also be changed according to the paper type. This configuration also generates a new color conversion table for outbound printing based on the difference between the outbound LUT 125*b* and return LUT 126*b* using coefficients previously defined for the paper type as described above, and uses the color conversion table that is generated in the color conversion process.

Third LUTs corresponding to different paper types may also be previously generated and stored, and the appropriate third LUT may be used in the color conversion process.

In addition, the color conversion process is executed on the host computer 1*b* side in the printing system 100*b* according to this embodiment, but may be executed on the printer 2*b* side.

Furthermore, the color conversion table is adjusted using the paper type as the printing condition in this embodiment, but the color conversion table may be adjusted according to other printing conditions, including temperature and humidity.

As described above, because the color conversion tables for outbound printing and return printing according to a printing condition, such as the type of paper used, are adjusted in a color conversion process that converts image data to ink colors used in the printer, an image processing device in a printing system according to this embodiment and variations thereof can minimize color differences between outbound printing and return printing under specific printing conditions.

In addition, adjusting the color conversion tables can be done by a relatively simple process using coefficients predetermined according to a printing condition.

Note that the foregoing embodiment describes a color conversion process from RGB color space to CMYK color space, the invention can also be applied to color conversion processes for converting between other color spaces.

The scope of the invention is not limited to the foregoing embodiment, and includes the invention described in the accompanying claims and equivalents thereof.

REFERENCE SIGNS LIST

1 host computer
2 printer
11 application executor
12 printer driver
21 controller
22 print mechanism
23 print unit
100 printing system
121 rendering unit
122 color converter
123 halftone processor
124 command generator
125 outbound LUT
126 return LUT
127 adjustment table
211 print controller
212 color conversion information adjuster
221 main scanning unit
222 sub-scanning unit
223 carriage motor
224 carriage
225 printhead
226 paper feed motor
227 nozzles
228 nozzle rows
229 print medium (paper)

The invention claimed is:

1. A printer comprising:
a print unit that moves a head in both a first direction and second direction; and
a controller that generates a first direction print image based on first direction color conversion information for a first print medium, and generates a second direction print image based on second direction color conversion information for a second print medium, the second direction color conversion information for the second print medium being generated by adjusting second direction color conversion information for the first print medium; and
the controller controlling the print unit to print the first direction print image in the first direction on the second print medium, and print the second direction print image in the second direction on the second print medium.

2. The printer described in claim 1, wherein:
the head can print multiple colors, and the order of colors printed in the first direction, and the order of colors printed in the second direction, are different.

3. The printer described in claim 1, wherein:
the controller controls the print unit; and prints the first direction print image and second direction print image in contrast to each other on the second print medium.

4. The printer described in claim 1, wherein:

the second direction color conversion information for the second print medium is the second direction color conversion information for the first print medium adjusted by a specific coefficient; and the controller generates plural second direction print images using second direction color conversion information for plural second print mediums adjusted based on multiple values of the specific coefficient, and controls the print unit to print each of the second direction print images in contrast to the first direction print image.

5. The printer described in claim 4, further comprising:

storage;

the controller acquiring an identifier related to one of the plural second direction print images printed on the second print medium by the print unit, and storing the identifier relationally to the specific coefficient corresponding to the one second direction print image.

6. The printer described in claim 5, wherein:

the printer can connect to a host device; and the controller, when controlling the print unit to print on the second print medium, when printing in the first direction, acquires from the host device and prints image data converted using the first direction color conversion information for the first print medium, and when printing in the second direction, acquires from the host device and prints image data converted using the second direction color conversion information for the second print medium that was adjusted based on a stored specific coefficient value.

7. A printing method comprising:

using a head capable of moving in both a first direction and a second direction while printing;

generating a first direction print image based on first direction color conversion information for the first print medium;

generating a second direction print image based on second direction color conversion information for the second print medium, the second direction color conversion information for the second print medium being generated by adjusting second direction color conversion information for the first print medium; and moving the head in the first direction to print the first direction print image on the second print medium, and moving the head in the second direction to print the second direction print image on the second print medium.

* * * * *